United States Patent
Cheng et al.

(10) Patent No.: US 12,506,603 B2
(45) Date of Patent: Dec. 23, 2025

(54) METHOD, DEVICE, AND STORAGE MEDIUM FOR DETERMINING EXTREMUM BASED ON SECURE MULTI-PARTY COMPUTATION

(71) Applicant: TENCENT TECHNOLOGY (SHENZHEN) COMPANY LIMITED, Shenzhen (CN)

(72) Inventors: Yong Cheng, Shenzhen (CN); Jie Jiang, Shenzhen (CN); Shu Liu, Shenzhen (CN); Yuhong Liu, Shenzhen (CN); Peng Chen, Shenzhen (CN); Yangyu Tao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 289 days.

(21) Appl. No.: 18/314,419

(22) Filed: May 9, 2023

(65) Prior Publication Data
US 2023/0283461 A1    Sep. 7, 2023

Related U.S. Application Data

(63) Continuation of application No. PCT/CN2022/108090, filed on Jul. 27, 2022.

(30) Foreign Application Priority Data

Aug. 18, 2021    (CN) .......................... 202110946118.3

(51) Int. Cl.
*H04L 9/08*    (2006.01)

(52) U.S. Cl.
CPC ........ *H04L 9/0869* (2013.01); *H04L 2209/46* (2013.01)

(58) Field of Classification Search
CPC ..... H04L 9/0869; H04L 2209/46; H04L 9/14; G06F 21/6245; G06F 7/588
(Continued)

(56) References Cited

U.S. PATENT DOCUMENTS

| 11,956,372 B2* | 4/2024 | Wei ..................... H04L 63/0236 |
| 2008/0021899 A1 | 1/2008 | Avidan et al. |
| 2019/0156705 A1* | 5/2019 | Hamada .............. H04L 63/0428 |
| 2020/0169416 A1* | 5/2020 | Gouget ................. H04L 9/0877 |

(Continued)

FOREIGN PATENT DOCUMENTS

| CN | 108334577 A | 7/2018 |
| CN | 108880782 A | 11/2018 |

(Continued)

OTHER PUBLICATIONS

The World Intellectual Property Organization (WIPO) International Search Report for PCT/CN2022/108090 Sep. 28, 2022 12 Pages (including translation).

(Continued)

*Primary Examiner* — Jahangir Kabir
(74) *Attorney, Agent, or Firm* — Anova Law Group, PLLC

(57) ABSTRACT

Method for determining an extremum based on secure multi-party computation includes: acquiring a $t^{th}$ mean obtained in $t^{th}$ round federated computation; performing $(t+1)^{th}$ round federated computation based on valid node data of an $i^{th}$ node device in response to the valid node data of the $i^{th}$ node device being greater than the $t^{th}$ mean; performing the $(t+1)^{th}$ round federated computation based on invalid node data in response to the valid node data of the $i^{th}$ node device being less than or equal to the $t^{th}$ mean; and determining that the valid node data of the $i^{th}$ node device is the extremum in response to the valid node data of the $i^{th}$ node device being greater than or equal to an $(n-1)^{th}$ mean after $(n-1)^{th}$ round federated computation.

20 Claims, 16 Drawing Sheets

(58) Field of Classification Search
USPC .......................................................... 713/189
See application file for complete search history.

(56) References Cited

U.S. PATENT DOCUMENTS

| | | |
|---|---|---|
| 2021/0191927 A1 | 6/2021 | Ikarashi et al. |
| 2021/0243014 A1 | 8/2021 | Ikarashi |
| 2021/0351916 A1 | 11/2021 | Tsuchida et al. |
| 2021/0365841 A1* | 11/2021 | Shaloudegi ............ G06N 3/098 |
| 2023/0033922 A1 | 2/2023 | Hamada et al. |
| 2023/0087864 A1 | 3/2023 | Cheng et al. |

FOREIGN PATENT DOCUMENTS

| | | |
|---|---|---|
| CN | 111444526 A | 7/2020 |
| CN | 112906044 A | 6/2021 |
| CN | 113032839 A | 6/2021 |
| CN | 113408001 A | 9/2021 |
| WO | 2018008543 A1 | 1/2018 |
| WO | 2019208485 A1 | 10/2019 |
| WO | 2019225401 A1 | 11/2019 |
| WO | 2020075273 A1 | 4/2020 |
| WO | 2021144973 A1 | 7/2021 |

OTHER PUBLICATIONS

David Evans, et al., "A Pragmatic Introduction to Secure Multi-Party Computation", NOW Publishers, 2018. (This version: Jun. 11, 2022) https://securecomputation.org/.

The Japan Patent Office (JPO) Notice of Reasons for Refusal for Application No. 2023-566958 Oct. 29, 2024 5 Pages (including translation).

* cited by examiner

METHOD, DEVICE, AND STORAGE MEDIUM FOR DETERMINING EXTREMUM BASED ON SECURE MULTI-PARTY COMPUTATION

CROSS-REFERENCES TO RELATED APPLICATIONS

This application is a continuation application of PCT Patent Application No. PCT/CN2022/108090, filed on Jul. 27, 2022, which claims priority to Chinese Patent Application No. 2021109461183, filed on Aug. 18, 2021, all of which are incorporated herein by reference in their entirety.

FIELD OF THE TECHNOLOGY

Embodiments of the present disclosure relate to the field of data security, and more particularly relates to a technology for determining an extremum based on secure multi-party computation.

BACKGROUND OF THE DISCLOSURE

Secure multi-party computation has a focus on how to securely compute a convention function without a trusted third party. Secure multi-party computation can realize secure data collaboration and fusion application, and can combine, based on compliance without exceeding data domains, multi-party data sources for computation, analysis and learning, thereby realizing data value sharing.

Often, determining an extremum based on secure multi-party computation means that at least two parties respectively have different data and need to compare their own data respectively to compute a maximum value or a minimum value. A multi-party data comparison method is usually implemented based on an oblivious transfer (OT) technology or a homomorphic encryption technology.

However, the value comparison method based on oblivious transfer only supports comparison of two-party data, although it is low in computation complexity. In a multi-party scenario, multi-time communication and interaction may have to be executed, resulting in high communication overhead and low in efficiency. The value comparison method is thus not applicable to a cross-public-network communication application scenario; and the value comparison method based on the homomorphic encryption technology is high in computation complexity and low in practical application value.

SUMMARY

Embodiments of the present disclosure provide a method, an apparatus, a device, and a storage medium for determining an extremum based on secure multi-party computation, which reduce computation complexity and communication overhead during extreme determination based on secure multi-party computation.

In one aspect, an embodiment of the present disclosure provides a method for determining an extremum based on secure multi-party computation. The method is executed by an $i^{th}$ node device in a federated computation system, and the federated computation system includes n node devices, n is an integer greater than 2, and i is a positive integer less than or equal to n. The method includes acquiring a $t^{th}$ mean obtained in $t^{th}$ round federated computation, where the $t^{th}$ mean is calculated based on n node data of the n node devices and an average coefficient, the n node data includes m valid node data, the average coefficient is decreased progressively along with increasing of the round number of federated computation, t is a positive integer less than n−1, and m is a positive integer less than or equal to n; performing $(t+1)^{th}$ round federated computation based on the valid node data of the $i^{th}$ node device in response to the valid node data of the $i^{th}$ node device is greater than the $t^{th}$ mean; performing $(t+1)^{th}$ round federated computation based on the invalid node data if the valid node data of the $i^{th}$ node device is less than or equal to the $t^{th}$ mean; and determining that the valid node data of the $i^{th}$ node device is the extremum in response to the valid node data of the $i^{th}$ node device is greater than or equal to an $(n-1)^{th}$ mean after $(n-1)^{th}$ round federated computation.

In another aspect, an embodiment of the present disclosure provides a computer device, including a processor and a memory; and the memory stores at least one instruction, at least one program, a code set or an instruction set, and the at least one instruction, the at least one program, the code set or the instruction set is loaded and executed by the processor to implement a method for determining an extremum based on secure multi-party computation, executed by an $i^{th}$ node device in a federated computation system, the federated computation system comprising n node devices, n being an integer greater than 2, i being a positive integer less than or equal to n. The method includes acquiring a $t^{th}$ mean obtained in $t^{th}$ round federated computation, the $t^{th}$ mean being calculated based on n node data of the n node devices and an average coefficient, the n node data comprising m valid node data, the average coefficient being decreased progressively along with increasing of the round number of federated computation, t being a positive integer less than n−1, and m being a positive integer less than or equal to n; performing $(t+1)^{th}$ round federated computation based on the valid node data of the $i^{th}$ node device in response to the valid node data of the $i^{th}$ node device being greater than the $t^{th}$ mean; performing the $(t+1)^{th}$ round federated computation based on the invalid node data in response to the valid node data of the $i^{th}$ node device being less than or equal to the $t^{th}$ mean; and determining that the valid node data of the $i^{th}$ node device is the extremum in response to the valid node data of the $i^{th}$ node device being greater than or equal to an $(n-1)^{th}$ mean after $(n-1)^{th}$ round federated computation.

In another aspect, an embodiment of the present disclosure provides a non-transitory computer-readable storage medium. The non-transitory computer-readable storage medium stores at least one computer program, and the computer program is loaded and executed by a processor to implement a method for determining an extremum based on secure multi-party computation, executed by an $i^{th}$ node device in a federated computation system, the federated computation system comprising n node devices, n being an integer greater than 2, i being a positive integer less than or equal to n. The method includes acquiring a $t^{th}$ mean obtained in $t^{th}$ round federated computation, the $t^{th}$ mean being calculated based on n node data of the n node devices and an average coefficient, the n node data comprising m valid node data, the average coefficient being decreased progressively along with increasing of the round number of federated computation, t being a positive integer less than n−1, and m being a positive integer less than or equal to n; performing $(t+1)^{th}$ round federated computation based on the valid node data of the $i^{th}$ node device in response to the valid node data of the $i^{th}$ node device being greater than the $t^{th}$ mean; performing the $(t+1)^{th}$ round federated computation based on the invalid node data in response to the valid node data of the $i^{th}$ node device being less than or equal to the $t^{th}$ mean; and determining that the valid node data of the $i^{th}$ node device is the extremum in response to the valid node data of the $i^{th}$ node device being greater than or equal to an $(n-1)^{th}$ mean after $(n-1)^{th}$ round federated computation.

The technical solutions provided in the embodiments of the present disclosure include at least the following beneficial effects.

As disclosed, the mean of the data corresponding to the n node devices is calculated, the node devices compare the own data with the mean jointly calculated in the previous round so as to confirm that the own data is not the extremum when the own data is less than the mean, replace the valid node data with the invalid node data for next-round mean computation when the own data is less than or equal to the mean so that the jointly-calculated mean can be converged and gradually approach the extremum, and accordingly, a result is obtained in the $(n-1)^{th}$ round, thereby effectively solving the problem about secure multi-party extremum computation; and in addition, the node devices do not need to reveal privacy data and a value relationship between the data, and based on the secure multi-party mean computation method, do not involve encryption and decryption operations, accordingly, the computation complexity and the communication overhead are low, and the computing efficiency can be improved.

DESCRIPTION OF EMBODIMENTS

Figure 1:
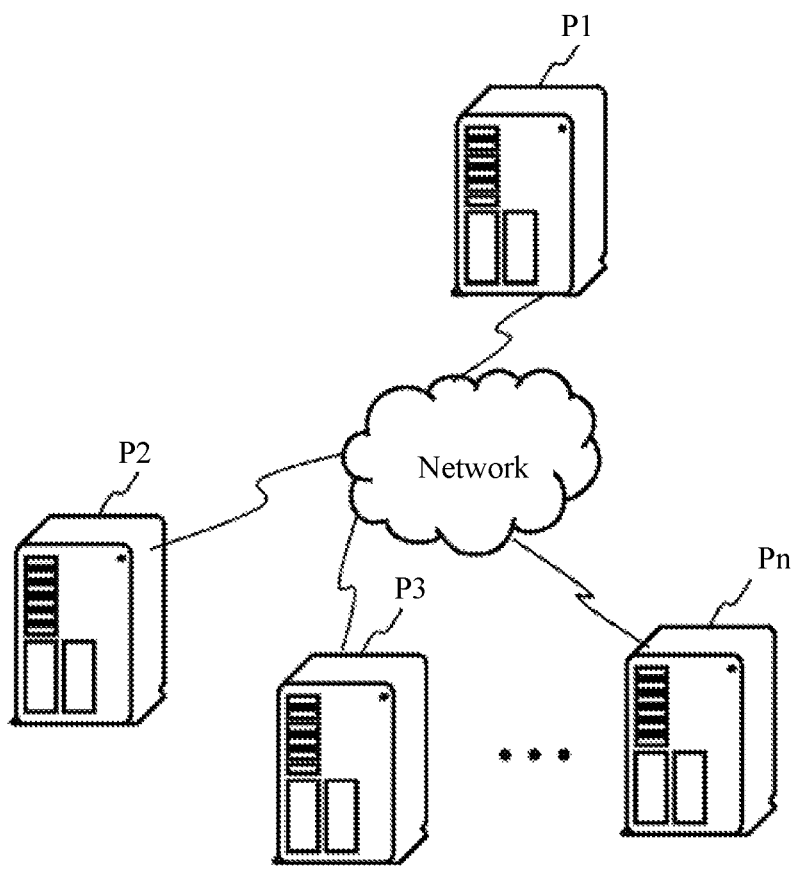
FIG. 1 is a schematic diagram of an implementation environment according to an embodiment of the present disclosure.

To make the objectives, technical solutions, and advantages of the present disclosure clearer, the following further describes implementations of the present disclosure in detail with reference to the accompanying drawings.

First, several terms involved in the embodiments of the present disclosure are introduced.

(1) Secure multi-party computation: There are n parties $P_1, P_2 \ldots P_n$, where the party $P_i$ has input data $X_i$, and the n parties jointly calculate a function $f(X_1, X_2 \ldots X_n)$ without revealing own input data to any other parties or getting assistance of any trusted organization. The secure multi-party computation is supported by a rich theoretical basis, and guarantees input data security by applying cryptography (e.g., homomorphic encryption), secret sharing, differential privacy and other security mechanisms, which is about to enter an engineering and large-scale application stage from a theoretical research stage.

(2) Secret sharing: Secret sharing is a cryptographic technique for segment storage of a secret, and aims to prevent the secret from being too intensive so as to spread risks and tolerate intrusion, which is an important means in information security and data privacy. The idea of secret sharing is about splitting the secret in a proper mode, split shares are managed by different parties, while a single party cannot recover secret information, and the secret information can be recovered only when the plurality of parties collaborate. More importantly, when the parties, in any corresponding range, have something wrong, the secret still cannot be completely recovered.

In recent years, due to user privacy, data security, compliance, business competition and other factors, it is very hard to integrate, based on compliance, distributed data sources to be computed, analyzed and studied. In the foregoing background, a solution based on secure multi-party computation (MPC) is booming, which can combine the plurality of distributed data sources for federated computation, federated data analysis and federated robot learning without centralizing the distributed data sources. Secure multi-party computation can realize secure data collaboration and fusion application, and combines, based on compliance without exceeding data domains, multi-party data sources for computation, analysis and learning, thereby realizing data value sharing. In related art, the solution for implementing secure multi-party computation usually has problems of high computation complexity and communication overhead, etc.

In order to solve the foregoing technical problems, the embodiment of the present disclosure provides a semi-honest security model, under which data of parties is not revealed. The semi-honest security model is also called an honest-but-curious security model, which indicates that both a party A and a party B can strictly obey a data value comparison and equality test protocol, cannot maliciously deviate from the protocol and cannot attack opposite parties maliciously or actively, but the parties can attempt to acquire more information in the protocol execution process.

FIG. 1 illustrates a block diagram of a federated computation system according to an embodiment of the present disclosure. The federated computation system includes n node devices (also called parties), namely, a node device $P_1$, a node device $P_2$ . . . a node device $P_n$, where n is an integer greater than 2. Any node device may be an independent physical server, may also be a server cluster constituted by a plurality of physical servers, or a distributed system, and may also be a cloud server providing basic cloud computing services such as cloud services, cloud databases, cloud computing, cloud functions, cloud storage, network services, cloud communication, middleware services, domain name services, security services, content delivery network (CDN), big data and an artificial intelligence platform. Any two node devices have different data sources, such as data sources of different companies, or data sources of different departments of the same company. The different node devices store different data. The different node devices are connected by a wireless network or a wired network.

The n node devices respectively store own data which cannot be revealed. When the node devices in the federated computation system have an extremum determining demand, each node device first performs secure multi-party averaging, and then compares own data with a mean, and when the own data is less than the mean, it is determined that the own data is not an extremum. After "obsolete" data is definite in current computation, the "obsolete" data is replaced with invalid node data (e.g., 0) to participate in next-round mean computation, and because data of at least one node device will be "obsoleted" after each-round computation, an average coefficient during mean computation is controlled to be decreased progressively along with increasing of the round number of federated computation, thereby achieving mean computation convergence, and gradually obsoleting the data which is not the extremum. In the process, the data of the parties will not be revealed, meanwhile, the interaction frequency is less, encryption and decryption operations are not needed, and thus, the communication overhead is less, and the computing efficiency is high.

In one embodiment, the plurality of node devices in the above federated computation system may constitute a blockchain, the node devices are nodes on the blockchain, and data involved in the secure multi-party extremum determining process can be stored on the blockchain.

Figure 2:
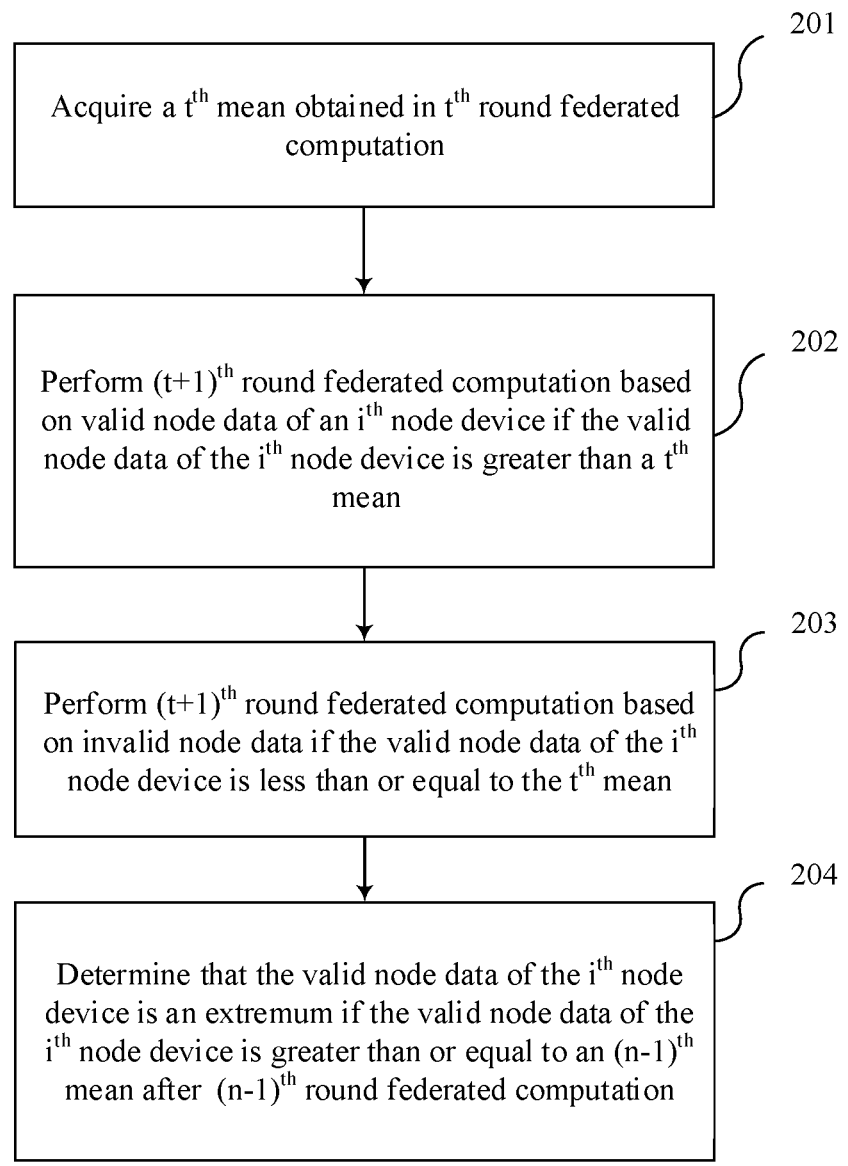
FIG. 2 is a flowchart of a method for determining an extremum based on secure multi-party computation according to an embodiment of the present disclosure.

FIG. 2 illustrates a flowchart of a secure multi-party computation method according to an exemplary embodiment of the present disclosure. The embodiment is described with executing, by an $i^{th}$ node device in a federated computation system, the method as an example. The federated computation system includes n node devices, n is an integer greater than 2, i is a positive integer less than or equal to n, and the method includes following steps.

Step 201: Acquire a $t^{th}$ mean obtained in $t^{th}$ round federated computation.

The $t^{th}$ mean is calculated based on n node data of the n node devices and an average coefficient, the n node data includes m valid node data, the average coefficient is decreased progressively along with increasing of the round number of federated computation, t is a positive integer less than n−1, and m is a positive integer less than or equal to n.

The node devices in the federated computation system first perform secure multi-party averaging, and then compare own data with a mean (plaintext comparison herein), and when the own data is less than the mean, it is determined that the own data is not an extremum. After "obsolete" data (i.e., less than or equal to the mean) is definite in current computation, the "obsolete" data is replaced with invalid node data (i.e., 0) to participate in next-round mean computation, and because data of at least one node device will be "obsoleted" after each-round federated computation, the average coefficient (i.e., a denominator of mean computation) during mean computation is controlled to be decreased progressively along with increasing of the round number of federated computation, thereby achieving mean computation convergence, and gradually obsoleting the data which is not the extremum.

In one embodiment, the federated computation system performs secure multi-party computation based on the node data of the n node devices and the average coefficient to obtain the $t^{th}$ mean jointly calculated in the current round, namely the $t^{th}$ round, where the n node data includes valid node data not obsoleted in the previous round and invalid node data, the valid node data is a true value of the data owned by the node devices, and the invalid node data is used for replacing valid node data less than or equal to the mean before $t^{th}$-round federated computation, for example, the invalid node data is 0, which means that the corresponding node device does not participate in subsequent mean computation.

Exemplarily, the valid node data of at least one node device is less than or equal to the $t^{th}$ mean after each-round federated computation, that is, at least one valid node data is replaced with invalid node data, but due to privacy of the data, the node devices can only confirm whether the own data is obsoleted or not and cannot know actual obsoleted data (i.e., the number of valid node data less than the mean) after current-round computation, accordingly, the average coefficient is set as (n+1−0, and starting from the second round, at least one data is obsoleted in each-round mean computation, the average coefficient is progressively decreased round by round, thereby ensuring that there are only two valid node data at most in the (n−1)$^{th}$ round. Thus, a computational formula of the $t^{th}$ mean $M_t$ is $M_t=(X_1+X_2+ \ldots +X_n)/(n+1-t)$, where $X_i$ is data (valid node data or invalid node data), for participating in mean computation, of an $i^{th}$ node device, and Xi is valid node data in the first-round computation process.

Step 202: Perform $(t+1)^{th}$ round federated computation based on the valid node data of the $i^{th}$ node device if the valid node data of the $i^{th}$ node device is greater than the $t^{th}$ mean.

The valid node data of the $i^{th}$ node device is greater than the $t^{th}$ mean, which indicates that the valid node data may be the extremum, and thus, the $i^{th}$ node device can continue to perform next-round (i.e., $(t+1)^{th}$ round) federated computation based on the valid node data thereof until the valid node data is obsoleted, that is, until the valid node data is less than or equal to the mean of a certain round, or the valid node data is determined as the extremum.

Step 203: Perform $(t+1)^{th}$ round federated computation based on the invalid node data if the valid node data of the $i^{th}$ node device is less than or equal to the $t^{th}$ mean.

The $i^{th}$ node device replaces the valid node data with the invalid node device to perform next-round mean computation when the valid node data of the $i^{th}$ node device is less than or equal to the $t^{th}$ mean.

When the valid node data of the $i^{th}$ node device is less than the $t^{th}$ mean, the $i^{th}$ node device can determine that the valid node data is not the extremum, and later, only needs to participate in mean computation based on the invalid node data without value comparison; and when the valid node data of the $i^{th}$ node device is equal to the $t^{th}$ mean, there may be a situation that the data is the extremum and valid node data of other node devices is similarly the extremum, that is, the data owned by at least two nodes is maximal and equal to each other; and in order to achieve mean computation convergence and avoid the situation of the mean greater than a maximum value (because the average coefficient is progressively decreased round by round), thus, when the valid node data of the $i^{th}$ node device is equal to the $t^{th}$ mean, the $i^{th}$ node device similarly uses the invalid node data to replace the valid node data for next-round mean computation, but value comparison is still needed.

Exemplarily, for four data "1, 2, 3 and 4", the mean calculated in the first round is 5/2, where 3 and 4 are greater than 5/2, and thus, in the second-round computation, 3 and 4 still participate in computation, 1 and 2 are replaced with 0, the average coefficient is reduced by 1, that is, (0+0+3+4)/3 is calculated.

Step 204: Determine that the valid node data of the $i^{th}$ node device is the extremum if the valid node data of the $i^{th}$ node device is greater than or equal to an $(n-1)^{th}$ mean after $(n-1)^{th}$ round federated computation.

When t is (n−1), at least one valid node data is replaced with the invalid node data in each round, thus, there are only two valid node data at most in the $(n-1)^{th}$ round, in addition, the average coefficient m is 2, and accordingly, an extremum computing result can be obtained after $(n-1)^{th}$ round federated computation is performed. When the valid node data of the $i^{th}$ node device is greater than the mean in the previous (n−2) rounds and is greater than or equal to (equivalently, there is a situation where two equal maximum values exist) the $(n-1)^{th}$ mean in the $(n-1)^{th}$ round, and thus, the valid node data is the extremum.

As such, the mean of the data corresponding to the n node devices is calculated, the node devices compare the own data with the mean of the previous round so as to confirm that the own data is not the extremum when the own data is less than the mean, replace the valid node data with the invalid node data for next-round mean computation when the own data is less than or equal to the mean so that the mean can be converged and gradually approach the extremum, and accordingly, an extremum determining result is obtained in the $(n-f1)^{th}$ round, thereby effectively solving the problem about secure multi-party extremum computation; and in addition, the node devices do not need to reveal privacy data and a value relationship between the data, and based on the secure multi-party mean computation method, do not involve encryption and decryption operations, accordingly, the computation complexity and the communication overhead are low, and the computing efficiency can be improved.

When floating-point numbers $X_1, X_2 \ldots X_n$ exist in numbers respectively own by the n parties (i.e., the node devices), all data may be first subjected to integer transfer and then subjected to federated computation, and an integer transfer method includes multiplying by a larger integer. For example, the party $P_k$ takes $\overline{X}_k = INT(QX_k)$, where INT denotes rounding, Q is a larger integer, such as ten to the power of six, and Q is determined based on consultation of the n parties. Then, mean computation and extremum determination are performed based on the rounding numbers. The main objective of integer transfer is to further hide range values of the numbers through modulo operation. Taking secure three-party extremum determination as an example, the three parties consult in computational accuracy Q, and then further need to consult in the value computation range, that is to consult in selecting the integer n (called modulus) to satisfy $|\overline{X}_1+\overline{X}_2+\overline{X}_3|<n/2$, or $|\overline{X}_1+\overline{X}_2+\overline{X}_3|<n/3$.

In one embodiment, to ensure smooth proceeding of mean computation and value comparison, the valid node data in the present disclosure may adopt positive numbers, and when the data of the node devices is negative numbers, negative number encoding is performed on the data before first-round federated computation, and data obtained after negative number encoding serves as valid node data. If $X_k<0$, the node device takes $X_k=X_k+n$, that is, the negative number is encoded (where $X_k$ is data after rounding), and thus, when $\overline{X}_1+\overline{X}_2+\overline{X}_3 \geq n/2$ or $\bigstar \overline{X}_1+\overline{X}_2+\overline{X}_3 \geq n/3$ occurs during computation, the node device can judge that an actual computing result indicates the negative numbers, that is, the true result is $|\overline{X}_1+\overline{X}_2+\overline{X}_3-n$.

Figure 3:
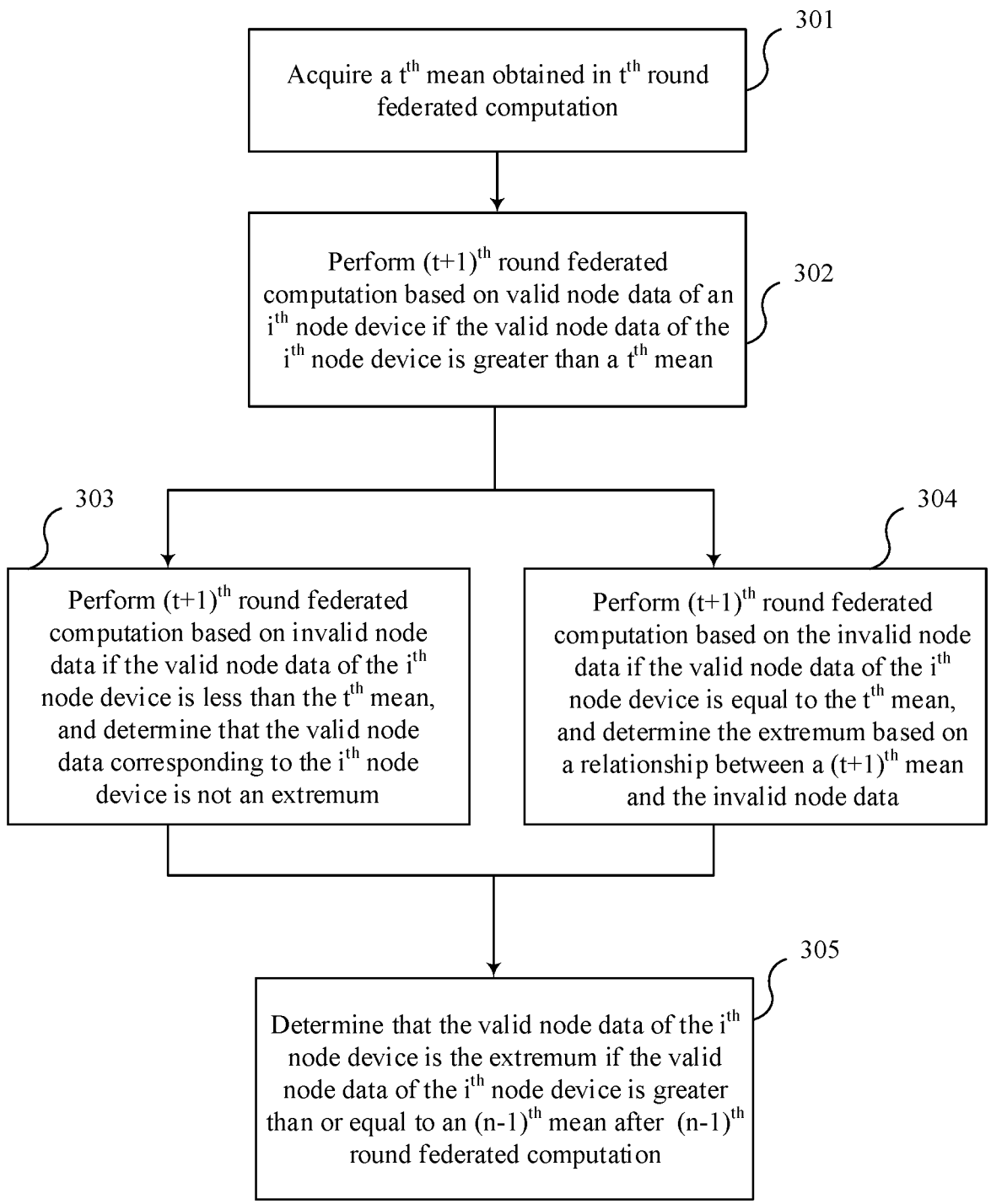
FIG. 3 is a flowchart of a method for determining an extremum based on secure multi-party computation according to an embodiment of the present disclosure.

FIG. 3 illustrates a flowchart of a secure multi-party computation method according to another exemplary embodiment of the present disclosure. The embodiment is described with executing, by an $i^{th}$ node device in a federated computation system, the method as an example. The federated computation system includes n node devices, n is an integer greater than 2, i is a positive integer less than or equal to n, and the method includes following steps.

Step 301: Acquire a $t^{th}$ mean jointly calculated in a $t^{th}$ round.

Step 302: Perform $(t+1)^{th}$ round federated computation based on valid node data of the $i^{th}$ node device if the valid node data of the $i^{th}$ node device is greater than the $t^{th}$ mean.

Exemplary implementations of step 301 to step 302 may refer to step 201 to step 202 described above, and are not repeated herein.

Step 303: Perform $(t+1)^{th}$ round federated computation based on invalid node data if the valid node data of the $i^{th}$ node device is less than the $t^{th}$ mean, and determine that the valid node data corresponding to the $i^{th}$ node device is not an extremum.

In one embodiment, the valid node data of the $i^{th}$ node device is less than the $i^{th}$ mean, which means that valid node data of other node devices is greater than the valid node data of the $i^{th}$ node device in the current federated computation process, and thus, the valid data of the $i^{th}$ node device is not the extremum in this step. In subsequent each-round mean computation, the $i^{th}$ node device only needs to participate in operation based on the invalid node data, the valid node data does not participate in operation, and there is no need to compare with the mean.

Step 304: Perform $(t+1)^{th}$ round federated computation based on the invalid node data if the valid node data of the $i^{th}$ node device is equal to the $t^{th}$ mean, and determine the extremum based on a relationship between a $(t+1)^{th}$ mean and the invalid node data.

In one embodiment, the valid node data of the $i^{th}$ node device is equal to the $i^{th}$ mean, which means that there are two possibilities in the current computation process. One possibility is that the valid node data of the other node devices is greater than the valid node data of the $i^{th}$ node device and the valid node data of the other node devices is less than the valid node data of the $i^{th}$ node device, under which the valid node data of the $i^{th}$ node device is not the extremum, for example, the mean of data "1, 2 and 3" is 2 in the first round; and the other possibility is that the valid node data of the $i^{th}$ node device is the extremum, and the valid node data of the other node devices is the extremum as well, for example, the mean of data "1, 1, 3 and 3" is 2 in the first round, and computation is performed based on "0, 0, 3 and 3" and the average coefficient being 3 to obtain the mean being 3. Thus, it is unable to directly determine whether the valid node data of the $i^{th}$ node device is not the extremum, and thus, federated computation is required to continue, and the data is compared with the mean.

To ensure that at least one valid node data is "obsoleted" after each-round federated computation and to make computation gradually converged, when the valid node data of the $i^{th}$ node device is equal to the mean, the $i^{th}$ node device participates in subsequent federated computation based on the invalid node data.

In one embodiment, when the valid node data of the $i^{th}$ node device is equal to the $t^{th}$ mean and t is not equal to (n−1), value comparison is performed in subsequent computation. Step 304 includes the following steps.

Step 304a: Determine that the valid node data corresponding to the $i^{th}$ node device is not the extremum if the $(t+1)^{th}$ mean is greater than the invalid node data.

After the $i^{th}$ node device performs, based on the invalid node data (the invalid node data is 0 in the embodiment of the present disclosure), $(t+1)^{th}$ round federated computation, if the $(t+1)^{th}$ mean is greater than the invalid node data, it means that the valid node data (greater than the $t^{th}$ mean) "wining" in the $t^{th}$ round exists in the $(t+1)^{th}$ round computing process, and corresponding to the foregoing first possibility, it can be determined that the valid node data in the $i^{th}$ node device is not the extremum.

For example, the mean of data "1, 2, 2 and 3" in the first round is 2, the node device with the valid node data being 2 at the moment cannot determine whether valid node data of other node devices is greater than 2 or not; and computation is performed based on "0, 0, 0 and 3" and the average coefficient being 3 in the second round to obtain the mean being 1, the mean is greater than the invalid node data being 0, and at the moment, it can be determined that the valid node data of the other node devices is greater than 2 in the first round, and thus, the valid node data being 2 is not the extremum.

Step 304b: Determine that the valid node data corresponding to the $i^{th}$ node device is the extremum if the $(t+1)^{th}$ mean is equal to the invalid node data, and t+1 is n−1.

After the $i^{th}$ node device performs $(t+1)^{th}$ round federated computation based on the invalid node data, if the $(t+1)^{th}$ mean is equal to the invalid node data and (t+1) is (n−1), namely, the last round computation, it means that no valid node data exists finally, that is, the extremum in the valid node data has been replaced with the invalid node data, and thus, the valid node data equal to the mean in the previous round is the extremum.

Step 304c: Determine the extremum based on a relationship between the invalid node data and a mean obtained through subsequent federated computation if the $(t+1)^{th}$ mean is equal to the invalid node data and t+1 is less than n−1.

When the $(t+1)^{th}$ mean is equal to the invalid node data but (t+1) is less than (n−1), that is, final-round federated computation is not reached, it can be determined that the valid node data equal to the $t^{th}$ mean in the $t^{th}$ round is a maximum value, but to ensure computation convergence, mean computation is required to continue until the average coefficient is (n−1).

In another embodiment, when the valid node data of the $i^{th}$ node device is equal to the $t^{th}$ mean and t is equal to (n−1), that is, during final-round computation, it can be directly determined that the valid node data of the $i^{th}$ node device is the extremum, and the node devices do not perform federated computation any more.

Figure 4:
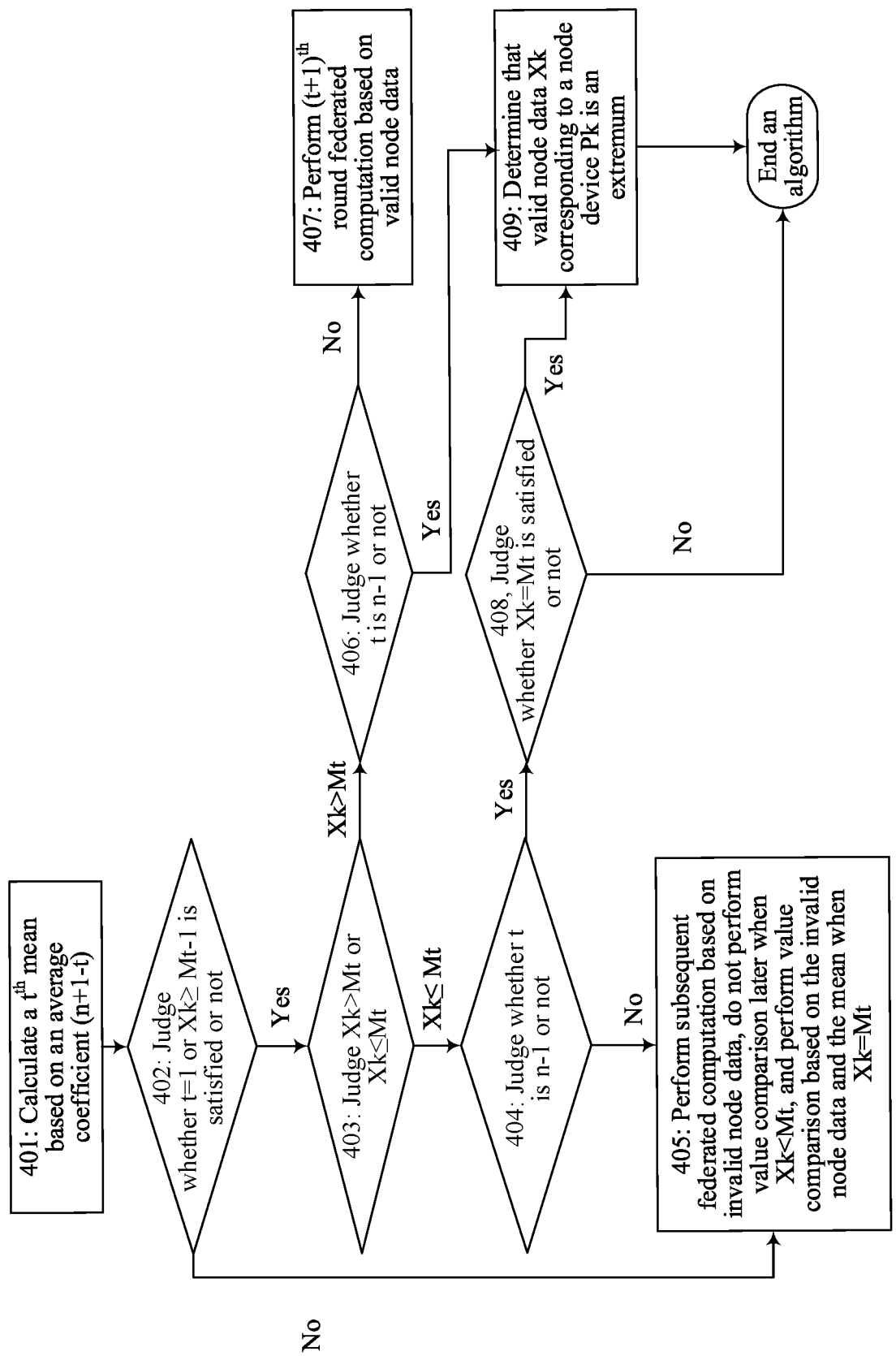
FIG. 4 is a flowchart of a method for determining an extremum based on secure multi-party computation according to an embodiment of the present disclosure.

Exemplarily, FIG. 4 illustrates a flowchart of performing value comparison and extremum determination based on a mean, and the process includes: Step 401: Calculate a $t^{th}$ mean based on an average coefficient (n+1−t). Step 402: Judge whether t=1 or $X_k \geq M_{t-1}$ is satisfied or not, if yes, perform step 403, and if not, perform step 405. Step 403: Judge which one of $X_k > M_t$ and $X_k \leq M_t$ is satisfied, if $X_k > M_t$, perform step 406, and if $X_k \leq M_t$, perform step 404. Step 404: Determine whether t is n−1 or not, if yes, perform step 408, and if not, perform step 405. Step 405: Perform subsequent federated computation based on invalid node data, do not perform value comparison later when $X_k < M_t$, and perform value comparison based on the invalid node data and the mean when $X_k = M_t$. Step 406: Judge whether t is (n−1) or not, if yes, perform step 409, and if not, perform step 407. Step 407: Perform $(t+1)^{th}$ round federated computation based on valid node data. Step 408: Judge whether $X_k = M_t$ is satisfied or not, if yes, perform step 409, and if not, determine that valid node data $X_k$ corresponding to a node device $P_k$ is not the extremum, and end the process. Step 409: Determine that the valid node data $X_k$ corresponding to the node device $P_k$ is the extremum. Where t is a round number of federated computation, $M_{t-1}$ is a $(t-1)^{th}$ mean obtained through $(t-1)^{th}$ federated computation, and $M_t$ is the $t^{th}$ mean obtained in $t^{th}$ round federated computation; and $X_k$ is valid node data of a kth node device.

Step 305: Determine that the valid node data of the $i^{th}$ node device is the extremum if the valid node data of the $i^{th}$ node device is greater than or equal to an $(n-1)^{th}$ mean after $(n-1)^{th}$ round federated computation.

Exemplary implementation of step 305 may refer to above step 203, which is not repeated herein.

The node devices judge whether the valid node data is the extremum or not by comparing the valid node data with the $t_{th}$ mean, replace the valid node data with the invalid node data for subsequent federated computation if the valid node data is less than or equal to the $t_{th}$ mean, and continue to perform value comparison based on the invalid node data and the subsequent mean when the valid node data is equal to the $t^{th}$ mean, thereby guaranteeing mean computation convergence, also preventing a possible extremum from being omitted, and ensuring reliability of extremum computation.

Figure 5:
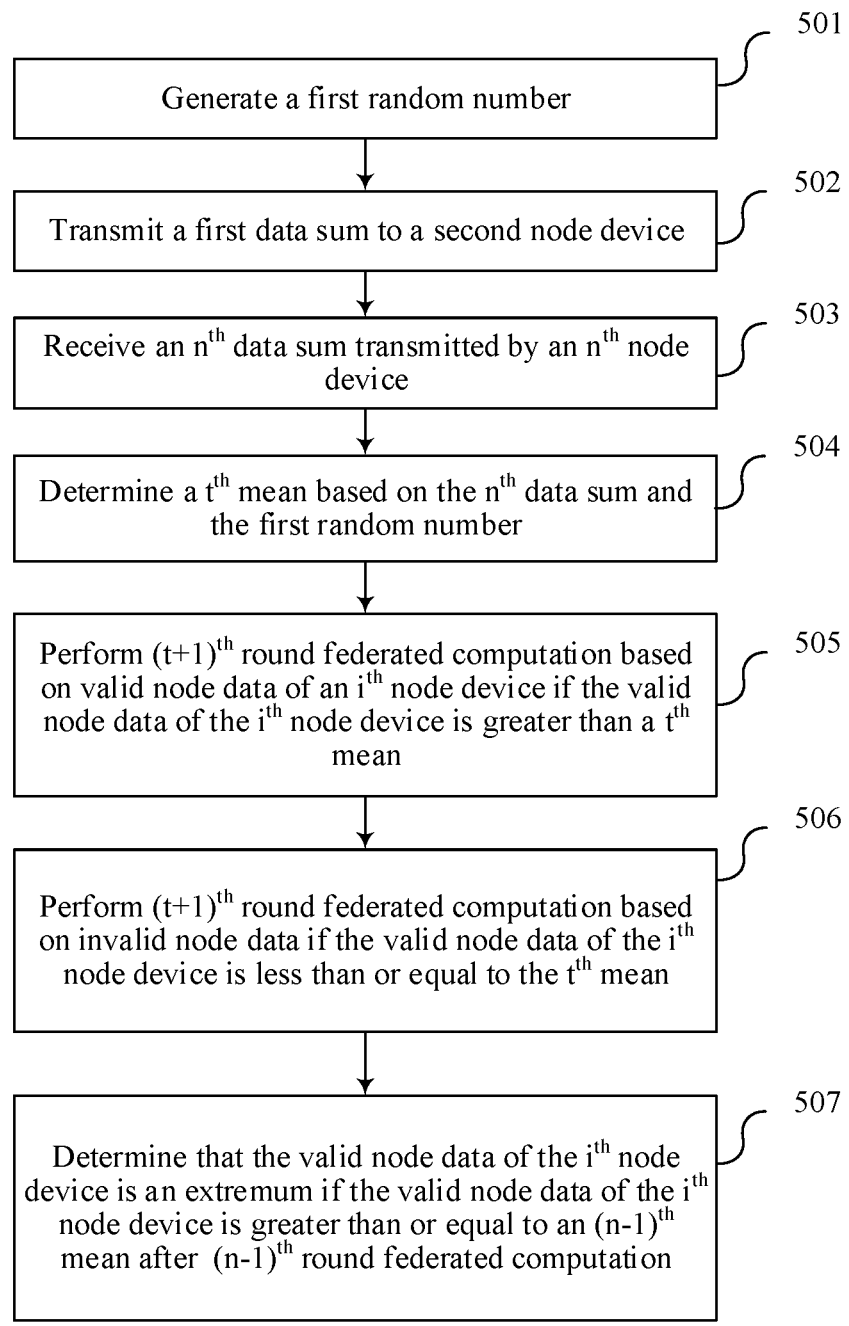
FIG. 5 is a flowchart of a method for determining an extremum based on secure multi-party computation according to an embodiment of the present disclosure.

The above embodiment illustrates the process of determining the extremum based on the secure multi-party computed mean. For secure computation of the mean, the embodiment of the present disclosure provides an implementation. FIG. 5 illustrates a flowchart of a secure multi-party computation method according to another exemplary embodiment of the present disclosure. The embodiment is described with executing, by a first node device in a federated computation system, the method as an example. The federated computation system includes n node devices, n is an integer greater than 2, and i is a positive integer less than or equal to n. The first node device refers to a node device configured to generate a first random number, and any one of the n node devices may serve as the first node device for mean computation. The method includes the following steps.

Step 501: Generate the first random number.

The first node device first generates the first random number $R_1$ after current federated computation starts. The first random number $R_1$ is a positive number.

Step 502: Transmit the first data sum to a second node device.

The first data sum is the sum of the first random number and first node data, the second node device is configured to calculate a second data sum and transmit the second data sum to a third node device, and the second data sum is the sum of the first data sum and second node data, where $j^{th}$ node data is valid node data or invalid node data of a $j^{th}$ node device, and j is a positive integer less than or equal to n.

After the first node device $P_1$ generates the first random number $R_1$, the first data sum $(R_1+X_1)$ is transmitted to the second node device $P_2$. After the second node device $P_2$ receives the first data sum $(R_1+X_1)$, the second data sum $(R_1+X_1+X_2)$ is calculated based on the first data sum $(R_1+X_1)$ and the second node data $X_2$ and transmitted to the third node device, and by analogy, an $n^{th}$ node device finally transmits an $n^{th}$ data sum $(R_1+X_1+X_2+\ldots+X_n)$ to the first node device.

Step 503: Receive the $n^{th}$ data sum transmitted by the $n^{th}$ node device.

Step 504: Determine a $t^{th}$ mean based on the $n^{th}$ data sum and the first random number.

After the first node device $P_1$ receives the $n^{th}$ data sum $(R_1+X_1+X_2+\ldots+X_n)$ transmitted by the $n^{th}$ node device, a node data sum $(R_1+X_1+X_2+\ldots+X_n-R_1)$ is calculated to obtain the sum of n node data, and thus, the $t^{th}$ mean is determined based on an average coefficient (n+1−t) after finishing n-party summation.

In one embodiment, after the first node device calculates the $t^{th}$ mean, the first node device can transmit the $t^{th}$ mean or an n-party summation result $(X_1+X_2+\ldots+X_n)$ to other node devices, or the first node device transmits the $t^{th}$ mean or an n-party summation result $(X_1+X_2+\ldots+X_n)$ to the second node device, the second node device transmits those to the third node device, and by analogy, the process continues until the $n^{th}$ node device receives the $t^{th}$ mean or the n-party summation result $(X_1+X_2+\ldots+X_n)$. This is not limited in the embodiment of the present disclosure.

A data sum transmitting sequence and start-stop positions can be determined by the n node devices through consultation, the sequence can be changed, that is, the n node devices can take turn to be the first node device for mean computation, thereby further improving data security, Step 505: Perform $(t+1)^{th}$ round federated computation based on valid node data of an $i^{th}$ node device if the valid node data of the $i^{th}$ node device is greater than the $t^{th}$ mean.

Step 506: Perform $(t+1)^{th}$ round federated computation based on the invalid node data if the valid node data of the $i^{th}$ node device is less than or equal to the $t^{th}$ mean.

Step 507: Determine that the valid node data of the $i^{th}$ node device is the extremum if the valid node data of the $i^{th}$ node device is greater than or equal to an $(n-1)^{th}$ mean after $(n-1)^{th}$ round federated computation.

Exemplary implementations of step 506 to step 507 may refer to step 202 to step 204 described above, and are not repeated herein.

In the embodiment of the present disclosure, the first node device is adopted to generate the first random number and transmit the sum of the first random number and the first node data to the second node device, later, the node devices sequentially add, based on the received data sum, the own data and transmit those to the next node device, and finally, the first node device can obtain the data sum of the n node data according to the data sum received by the first node device and the first random number so as to calculate the mean. In the process, each node device cannot obtain the data of any other node device, thereby guaranteeing data security and satisfying demands of secure multi-party computation.

The above embodiment illustrates the process of mean computation when the $i^{th}$ node device is the first node device. To more clearly describe the process, following steps are performed for acquiring the $t^{th}$ mean by the $j^{th}$ node device being not the first node device.

Step 1: Receive a $(j-1)^{th}$ data sum transmitted by a $(j-1)^{th}$ node device. The $(j-1)^{th}$ data sum is the sum of the first random number and the first node data to $(j-1)^{th}$ node data, and j is an integer greater than 1 and less than or equal to n.

Step 2: Determine a $j^{th}$ data sum based on the $(j-1)^{th}$ data sum. The $j^{th}$ data sum is the sum of the $(j-1)^{th}$ data sum and $j^{th}$ node data.

Step 3: Transmit the $j^{th}$ data sum to a $(j+1)^{th}$ node device when j is not equal to n. The $j^{th}$ data sum is transmitted to the first node device when i is equal to n.

Mean computation in the embodiment of the present disclosure is implemented based on a ring topology architecture. Except the first node device, each node device calculates the $j^{th}$ data sum based on the $(j-1)^{th}$ data sum transmitted by the previous node device and transmits the $j^{th}$ data sum to the next node device, and finally, the $n^{th}$ node device transmits the $n^{th}$ data sum to the first node device to complete a data closed loop. The $(j-1)^{th}$ data sum is the sum of the first random number and the first node data to the $(j-1)^{th}$ node data, namely, $(R_1+X_1+X_2+\ldots+X_{j-1})$. The $j^{th}$ data sum is the sum of the $(j-1)^{th}$ data sum and the $j^{th}$ node data, namely, the sum $(R_1+X_1+X_2+\ldots+X_{j-1}+X_j)$ of the first random number and the first node data to the $j^{th}$ node data.

Figure 6:
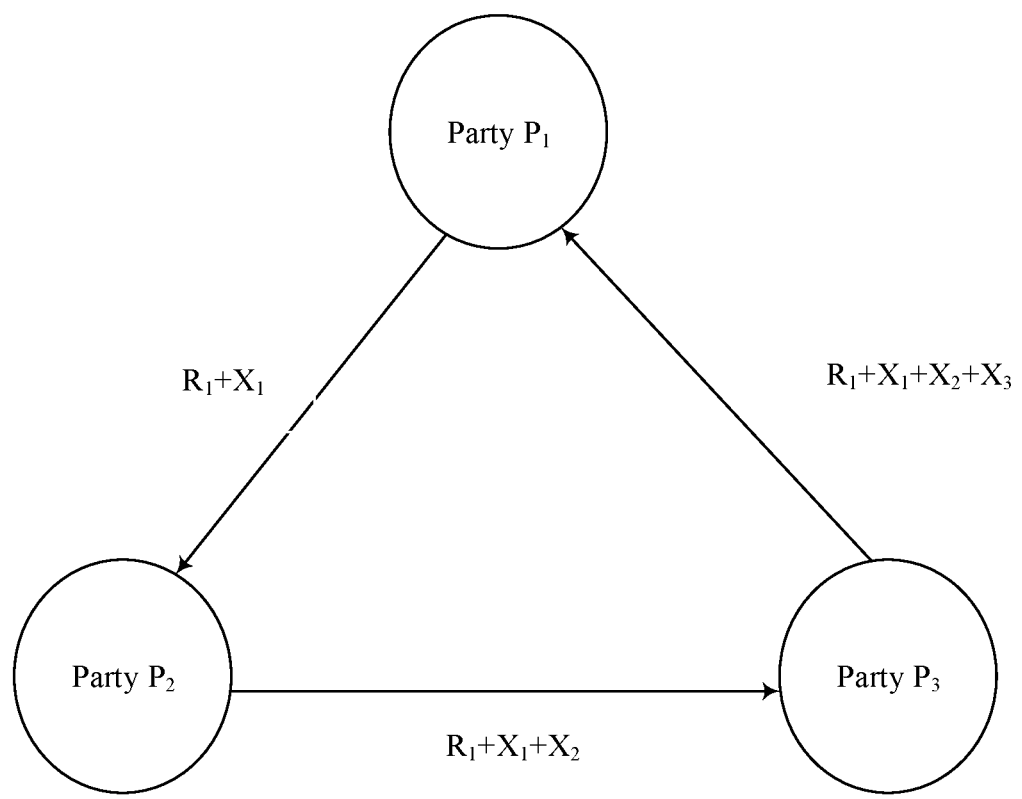
FIG. 6 is a schematic diagram of secure mean computation by three parties according to an embodiment of the present disclosure.

Exemplarily, FIG. 6 illustrates a process of federated computation of a mean when three node devices perform extremum determination. A party $P_1$ generates a first random number $R_1$ and transmits $(R_1+X_1)$ to a party $P_2$. After receiving $(R_1+X_1)$, the party $P_2$ calculates $(R_1+X_1+X_2)$ and transmits $(R_1+X_1+X_2)$ to a party $P_3$. After receiving $(R_1+X_1+X_2)$, the party $P_3$ calculates $(R_1+X_1+X_2+X_3)$ and transmits $(R_1+X_1+X_2+X_3)$ to the party $P_1$. After receiving $(R_1+X_1+X_2+X_3)$, the party $P_1$ calculates, based on the first random number $R_1$, $(R_1+X_1+X_2+X_3-R1)$ to obtain a data sum $(X_1+X_2+X_3)$ of the three parties, and then, calculates a mean of the three parties, namely, $(X_1+X_2+X_3)/(n+1-t)$, where n is 3, and t is a current round number.

Figure 7:
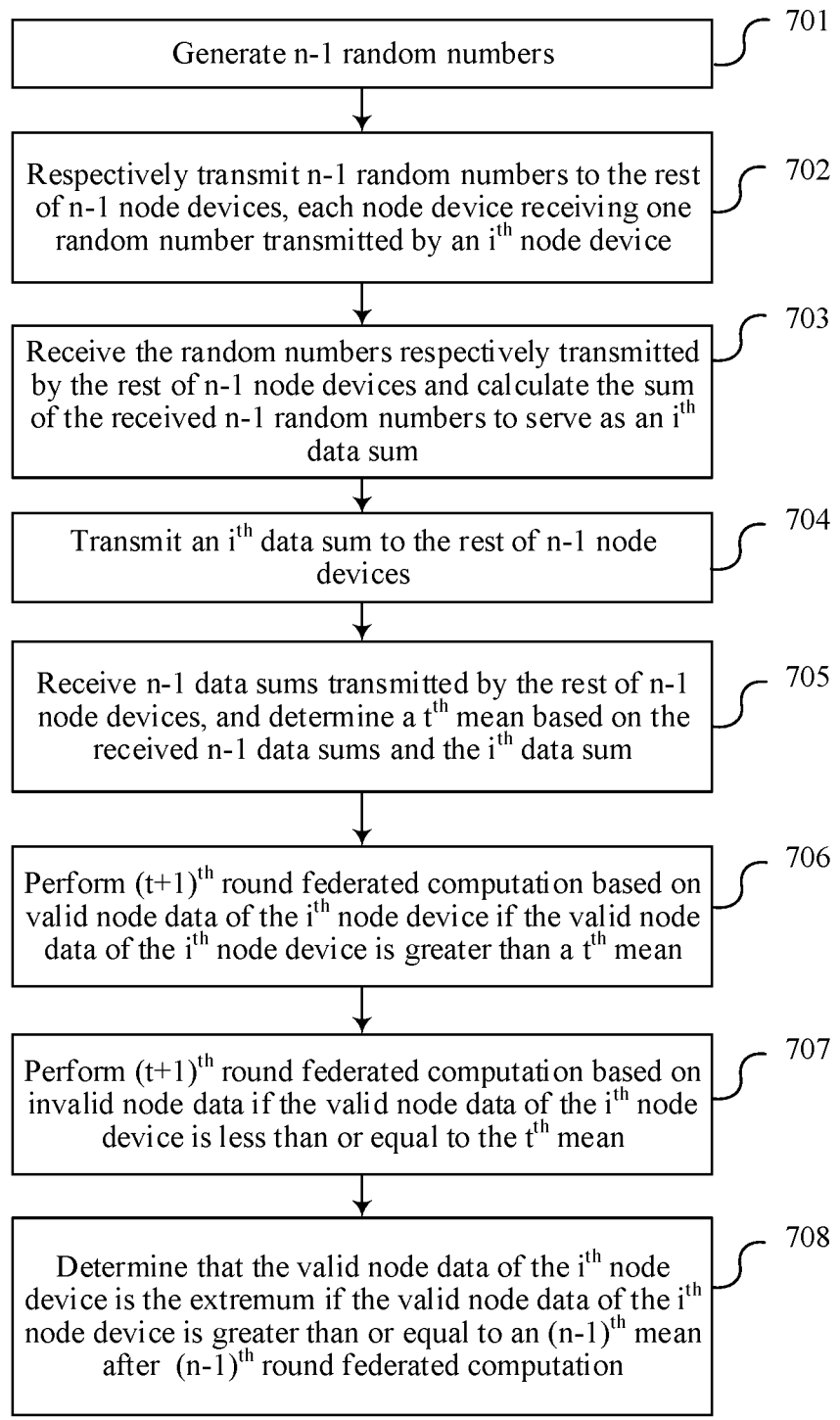
FIG. 7 is a flowchart of a method for determining an extremum based on secure multi-party computation according to an embodiment of the present disclosure.

The above embodiment illustrates the process of secure multi-party mean solving based on the ring topology architecture. In another embodiment, the n node devices may also implement secure multi-party mean solving through a peer-to-peer (P2P) network. FIG. 7 illustrates a flowchart of a secure multi-party computation method according to another exemplary embodiment of the present disclosure. The embodiment is described with executing, by an $i^{th}$ node device in a federated computation system, the method as an example. The federated computation system includes n node devices, n is an integer greater than 2, and i is a positive integer less than or equal to n. The method includes the following steps.

Step 701: Generate n−1 random numbers.

The sum of the (n−1) random numbers is $i^{th}$ node data, and the $i^{th}$ node data is valid node data or invalid node data of an $i^{th}$ node device.

In the P2P network, during mean computation, each node device generates (n−1) random numbers, and the sum of the n−1 random numbers is the $i^{th}$ node data, namely, $r_1+r_2+\ldots+r_{n-1}=X_i$. The $i^{th}$ node data is the valid node data or the invalid node data.

Step 702: Respectively transmit the n−1 random numbers to the rest of n−1 node devices, where each node device receives one random number transmitted by the $i^{th}$ node device.

The $i^{th}$ node device respectively transmits the (n−1) node data to the rest of (n−1) node devices, so that each node device receives one random number transmitted by the $i^{th}$ node device.

Step 703: Receive the random numbers respectively transmitted by the rest of n−1 node devices, and calculate the sum of the received n−1 random numbers to serve as an $i^{th}$ data sum.

Because each node device needs to generate the (n−1) random numbers and respectively transmit the (n−1) random numbers to the other node devices, the $i^{th}$ node device will receive the random numbers respectively transmitted by the other (n−1) node devices, totally, (n−1) random numbers.

After the $i^{th}$ node device receives the (n−1) random numbers, the $i^{th}$ data sum is calculated, that is, the received n−1 random numbers are added. For example, a first node device calculates the sum of random numbers respectively transmitted by a second node device to an $n^{th}$ node device to obtain a first data sum.

Step 704: Transmit the $i^{th}$ data sum to the rest of n−1 node devices.

After each node device calculates the $i^{th}$ data sum, the $i^{th}$ data sum is transmitted to the other (n−1) node devices.

Step 705: Receive n−1 data sums transmitted by the rest of n−1 node devices, and determine a $t^{th}$ mean based on the received n−1 data sums and the $i^{th}$ data sum.

Each node device receives the data sums transmitted by the rest of (n−1) node devices, there are totally (n−1) data sums, the (n−1) data sums and the $i^{th}$ data sum calculated based on the (n−1) data sums are added to obtain the sum of the n node data, and then the $t^{th}$ mean is calculated based on the solved sum of the n node data. In the process, the node data is split, and each node device acquires a part of each node data, so as to jointly calculate the mean.

Figure 8:
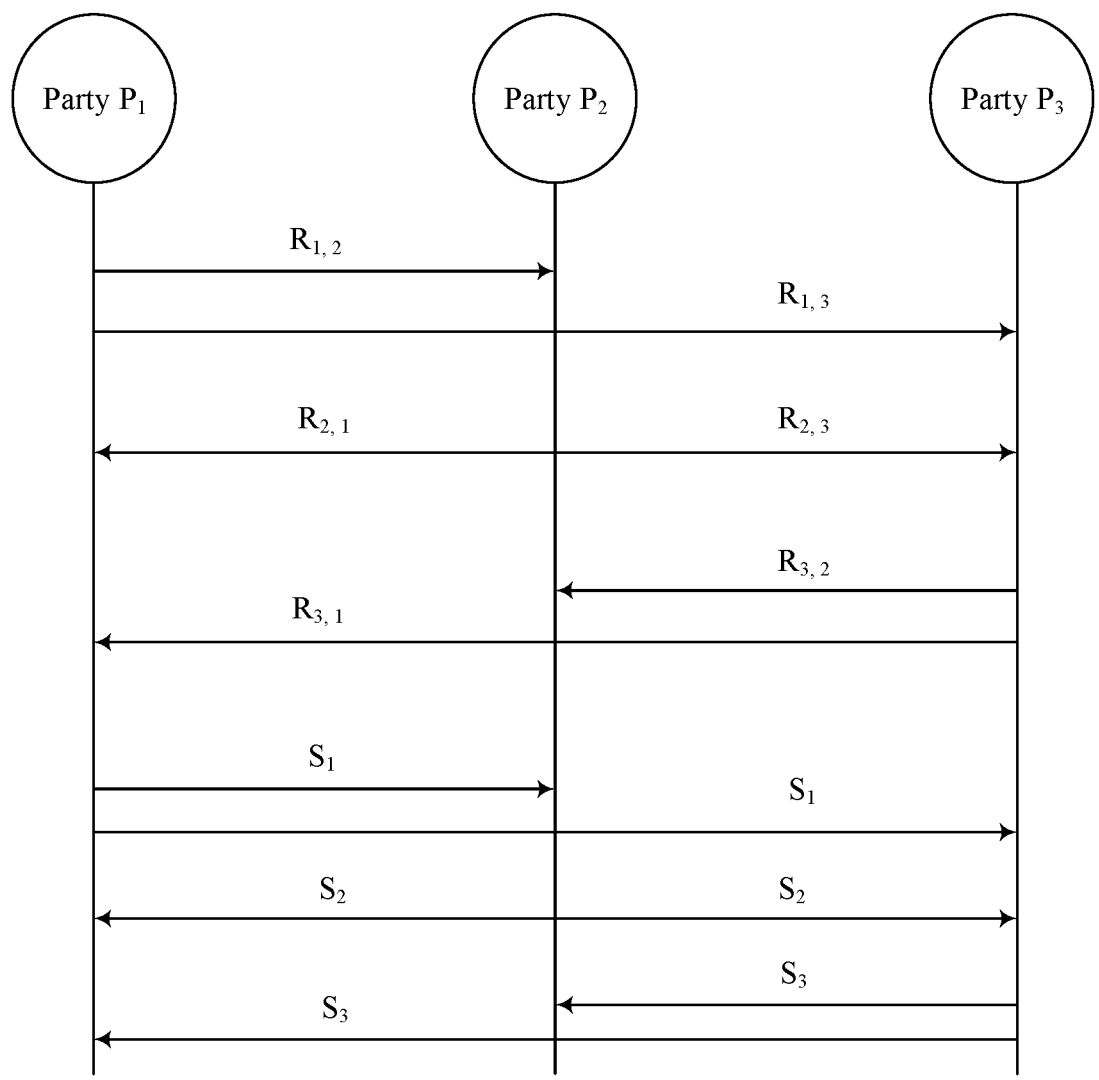
FIG. 8 is a schematic diagram of secure mean computation by three parties according to an embodiment of the present disclosure.

Exemplarily, FIG. 8 illustrates a process of secure computation of a mean when three parties perform extremum determination. A party $P_1$ generates random numbers $R_{1,2}$ and $R_{1,3}$ which satisfy $X_1=R_{1,2}+R_{1,3}$, and respectively transmits $R_{1,2}$ and $R_{1,3}$ to a party $P_2$ and a party $P_3$. Similarly, the party $P_2$ generates random numbers $R_{2,1}$ and $R_{2,3}$ which satisfy $X_2=R_{2,1}+R_{2,3}$, and respectively transmits $R_{2,1}$ and $R_{2,3}$ to the party $P_1$ and the party $P_3$, and the party $P_3$ generates random numbers $R_{3,1}$ and $R_{3,2}$ which satisfy $X_3=R_{3,1}+R_{3,2}$, and respectively transmits $R_{3,1}$ and $R_{3,2}$ to the party $P_1$ and the party $P_2$; the party $P_1$ calculates a first data sum $S_1=R_{2,1}+R_{3,1}$, the party $P_2$ calculates a second data sum $S_2=R_{1,2}+R_{3,2}$, and the party $P_3$ calculates a third data sum $S_3=R_{2,3}+R_{1,3}$; the party $P_1$ transmits $S_1$ to the party $P_2$ and the party $P_3$, the party $P_2$ transmits $S_2$ to the party $P_1$ and the party $P_3$, and the party $P_3$ transmits $S_3$ to the party $P_2$ and the party $P_1$; the party $P_1$, the party $P_2$ and the party $P_3$ respectively calculate the sum of the numbers of the three parties: $S_1+S_2+S_3=R_{2,1}+R_{3,1}+R_{1,2}+R_{3,2}+R_{2,3}+R_{1,3}=X_1+X_2+X_3$; and the three parties can calculate a $t^{th}$ round mean $(X_1+X_2+X_3)/(n+1-t)$.

Step 706: Perform $(t+1)^{th}$ round federated computation based on valid node data of an $i^{th}$ node device if the valid node data of the $i^{th}$ node device is greater than the $t^{th}$ mean.

Step 707: Perform $(t+1)^{th}$ round federated computation based on the invalid node data if the valid node data of the $i^{th}$ node device is less than or equal to the $t^{th}$ mean.

Step 708: Determine that the valid node data of the $i^{th}$ node device is the extremum if the valid node data of the $i^{th}$ node device is greater than or equal to an $(n-1)^{th}$ mean after $(n-1)^{th}$ round federated computation.

Exemplary implementations of step 706 to step 708 may refer to step 202 to step 204 described above, and are not repeated herein.

In the embodiment of the present disclosure, each node device splits the own node data into the n−1 random numbers and respectively transmits the n−1 random numbers to the rest of n−1 node devices, so that each node device is adopted to perform summation operation based on a part of each node data and finally exchanges the solved data sums to obtain the current mean. In the process, each node device cannot acquire complete data of any other node device, thereby ensuring data security, and satisfying demands of secure multi-party computation.

In the above various embodiments, there are actually only two valid node data at most to participate in the process of $(n-1)^{th}$ round federated computation, and thus, in the process of $(n-1)^{th}$ round computation, there is a risk of leaking the valid node data of the parties (i.e., one party having the valid node data can calculate the valid node data of the other party according to the $(n-1)^{th}$ mean). Thus, to further enhance security of an extremum determining solution provided by the present disclosure, $(n-1)^{th}$ round value comparison may be performed without adopting the above mean-based computation method, but each node device respectively calculates $X_i^{n-1}-X_1X_2\ldots X_n$, where $X_i$ is the valid node data of the node devices, the product behind the minus does not include $X_i$ and is the product of the other (n−1) node data except $X_i$. If $X_i$ is less than an $(n-2)^{th}$ mean during $(n-2)^{th}$ round computation, the valid node data of the $i^{th}$ node device is not the extremum; and if $X_i$ is greater than or equal to the $(n-2)^{th}$ mean during $(n-2)^{th}$ round computation and a computing result of $X_i^{n-1}-X_1X_2\ldots X_n$ in the $(n-1)^{th}$ round is greater than or equal to 0, the valid node data of the $i^{th}$ node device is the extremum.

Figure 9:
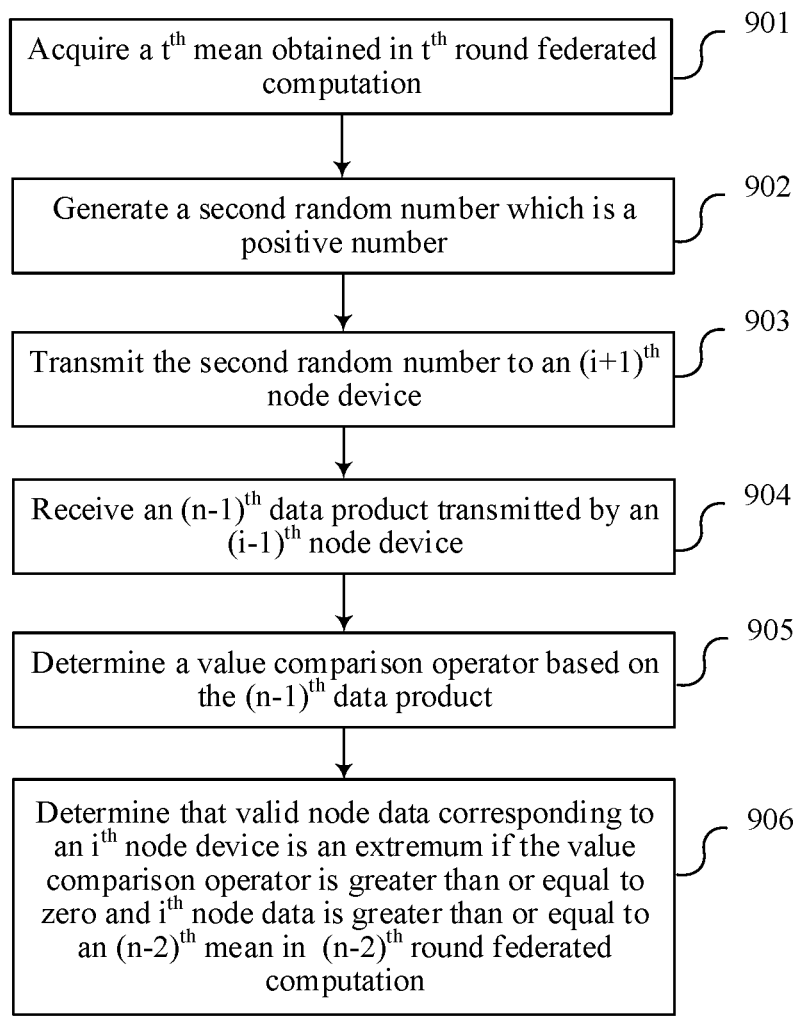
FIG. 9 is a flowchart of a method for determining an extremum based on secure multi-party computation according to an embodiment of the present disclosure.

FIG. 9 illustrates a flowchart of a secure multi-party computation method according to another exemplary embodiment of the present disclosure. The embodiment is described with executing, by an $i^{th}$ node device in a federated computation system, the method as an example. The federated computation system includes n node devices, n is an integer greater than 2, and i is a positive integer less than or equal to n. When t is n−2 and t+1 is n−1, the method includes the following steps.

Step 901: Acquire a $t^{th}$ mean jointly calculated in a $t^{th}$ round.

Exemplary implementation of step 901 may refer to step 201 described above, which is not repeated herein.

Step 902: Generate a second random number. The second random number is a positive number.

An $i^{th}$ node device $P_i$ generates a positive second random number $R_{2i}$ to protect data privacy.

Step 903: Transmit the second random number to an $(i+1)^{th}$ node device.

The $(i+1)^{th}$ node device is configured to calculate a first data product $R_{2i}X_{i+1}$ and transmit the first data product to an $(i+2)^{th}$ node device, and the first data product is the product of the second random number and valid node data of the $(i+1)^{th}$ node device.

Each node device transmits a data product calculated by the node device to a next node device, later, each node device multiplies the received data product by own valid node data and transmits a computing result to a next node device until an $(i-1)^{th}$ node device calculates an $(n-1)^{th}$ data product $R_{2i}X_1X_2\ldots X_n$ in which the valid node data $X_i$ of the $i^{th}$ node device is excluded.

Step 904: Receive the $(n-1)^{th}$ data product transmitted by the $(i-1)^{th}$ node device.

The $(n-1)^{th}$ data product is the product of the valid node data of the (n−1) node devices except the $i^{th}$ node device in the n node devices and the second random number, namely, $R_{2i}X_1X_2\ldots X_n$.

After generating the $(n-1)^{th}$ data product, the $(i-1)^{th}$ node device transmits the $(n-1)^{th}$ data product to the $i^{th}$ node device.

Step 905: Determine a value comparison operator based on the $(n-1)^{th}$ data product.

The value comparison operator is a difference between the valid node data corresponding to the $i^{th}$ node device to the power of $(n-1)$ and the $(n-1)^{th}$ data product.

After the $i^{th}$ node device acquires the $(n-1)^{th}$ data product $R_{2i}X_1X_2 \ldots X_n$ divided by the second random number, and then the symbol (i.e., greater than zero, equal to zero or less than zero) of the value comparison operator $X_i^{n-t}-X_1X_2 \ldots X_n$ is obtained through computation. It's worth noting that computation is performed in an integer domain, $|X_1X_2 \ldots X_n|<n/2$ or $|X_1X_2 \ldots X_n|<n/3$ is required to be satisfied, and $|X_i^{n-1}-X_2X_3 \ldots X_n|<n/2$ or $|X_i^{n-1}-X_2X_3 \ldots X_n|<n/3$.

Step 906: Determine that the valid node data corresponding to the $i^{th}$ node device is the extremum if the value comparison operator is greater than or equal to zero and the $i^{th}$ node data is greater than or equal to an $(n-2)^{th}$ mean in $(n-2)^{th}$ round federated computation.

Figure 10:
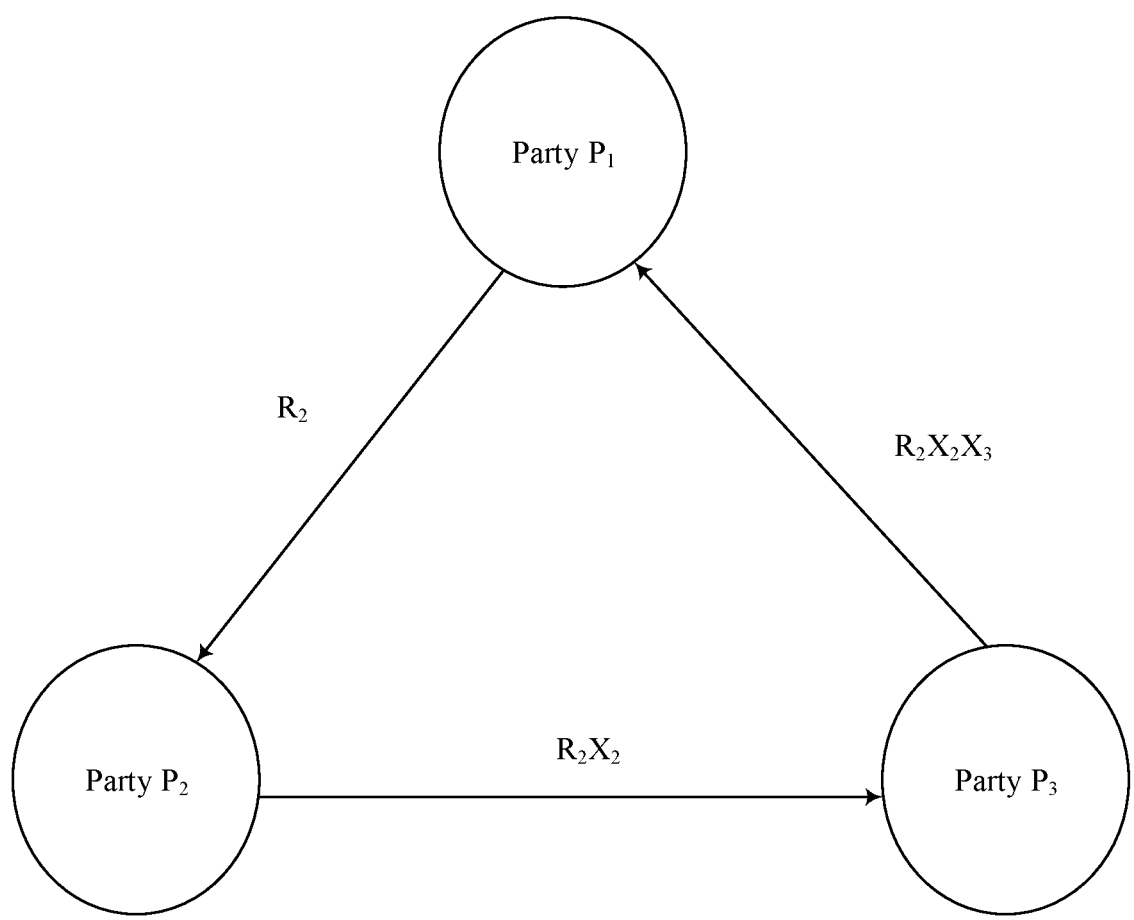
FIG. 10 is a schematic diagram of secure extremum determination by three parties according to an embodiment of the present disclosure.

Exemplarily, FIG. 10 illustrates a process of determining an $(n-1)^{th}$ round (i.e., a second round) extremum by three parties. A party $P_1$ generates a second random number $R_2$ and transmits $R_2$ to a party $P_2$; the party $P_2$ performs computation and transmits $R_2X_2$ to a party $P_3$; the party $P_3$ receives $R_2X_2$ and transmits $R_2X_2X_3$ to the party $P_1$; and the party $P_1$ receives $R_2X_2X_3$ and calculates $X_1^2-X_2X_3$. Similarly, the party $P_2$ and the party $P_3$ both execute the above steps and respectively calculate $X_2^2-X_1X_3$ and $X_3^2-X_1X_2$.

In the embodiment of the present disclosure, when $(n-1)^{th}$ round extremum determination is performed, value comparison is performed without continuing to adopt the mean-based computation method, but the value comparison operator is calculated through a secure multi-party multiplication computation method, which can avoid the situation that the node device having the valid node data can calculate the other valid node data when there are only two valid node data left, thereby further improving data security.

Figure 11:
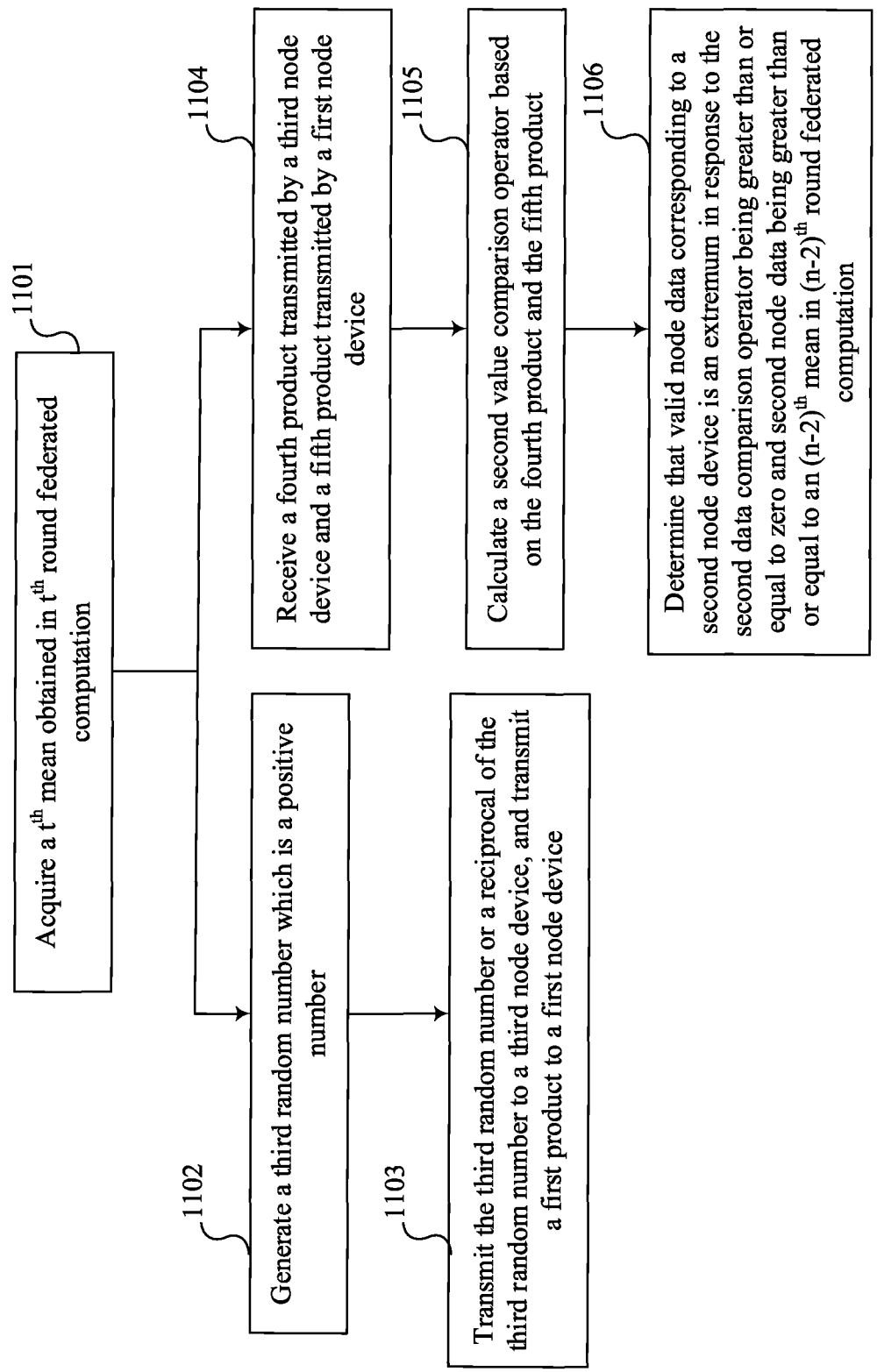
FIG. 11 is a flowchart of a method for determining an extremum based on secure multi-party computation according to an embodiment of the present disclosure.

The above embodiment illustrates the first process of determining the $(n-1)^{th}$ extremum based on secure multi-party multiplication computation. In one embodiment, specific to the situation of the three parties, namely, n=3, there is a second manner to determine the $(n-1)^{th}$ round (i.e., the second round) extremum. FIG. 11 illustrates a flowchart of a secure multi-party computation method according to another exemplary embodiment of the present disclosure. The embodiment is described with executing, by an $i^{th}$ node device in a federated computation system, the method as an example. The federated computation system includes n node devices, n is an integer greater than 2, and i is a positive integer less than or equal to n. When n is 3 and t+1 is n−1, the method includes the following steps.

Step 1101: Acquire a $t^{th}$ mean obtained in $t^{th}$ round federated computation.

Exemplary implementation of step 1101 may refer to above step 201, which is not repeated in the embodiment of the present disclosure.

Step 1102: Generate a third random number which is a positive number.

A second node device generates a third random number $R_3$ to protect data privacy.

Step 1103: Transmit the third random number or a reciprocal of the third random number to a third node device, and transmit a first product to a first node device.

The first product is the product of the third random number and valid node data of the second node device. The third node device is configured to calculate a second product and transmit the second product to the first node device. The second product is the product of the reciprocal of the third random number and valid node data of the third node device. The first node device is configured to receive the first product and the second product and calculate a first value comparison operator based on the first product and the second product, the first value comparison operator is a difference between the square of valid node data of the first node device and a third product, and the third product is the product of second node data and third node data.

Figure 12:
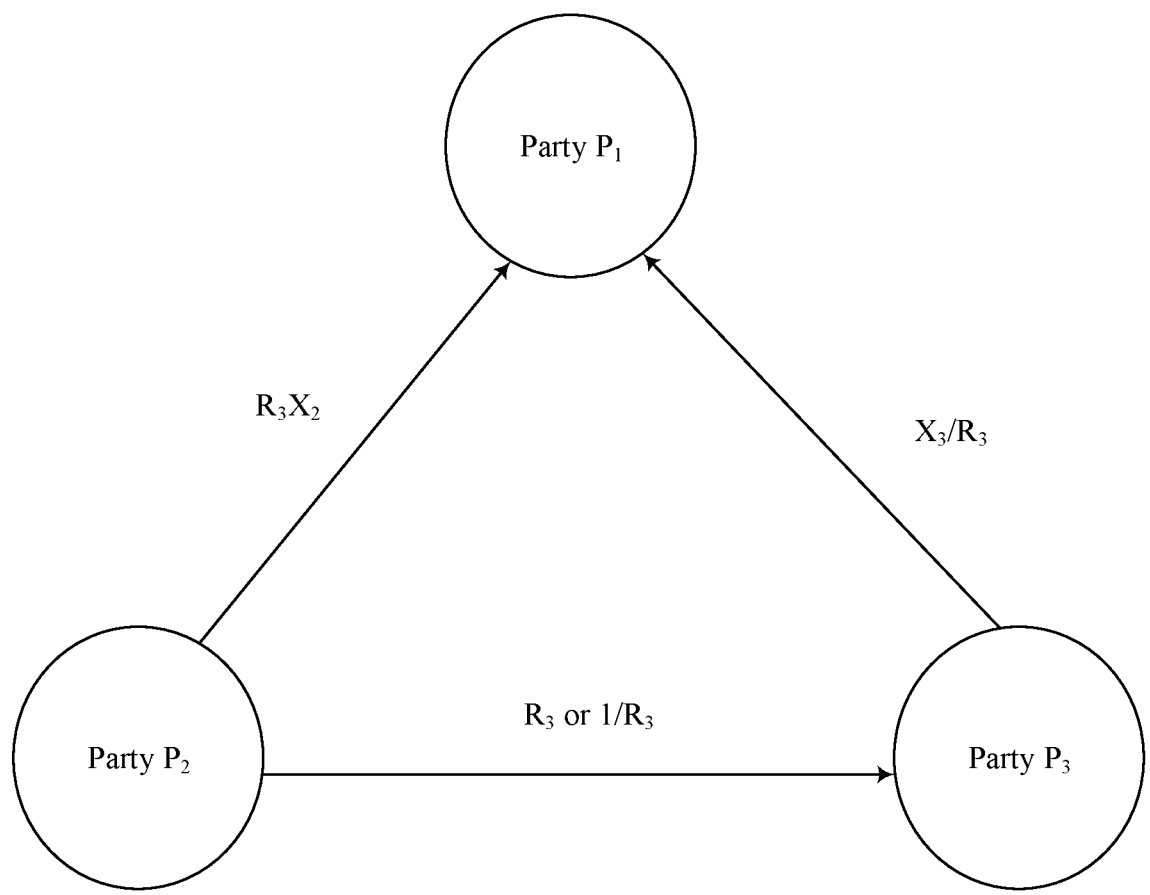
FIG. 12 is a schematic diagram of secure mean determination by three parties according to an embodiment of the present disclosure.

Exemplarily, as shown in FIG. 12, the party $P_2$ generates the third random number $R_3$, transmits $R_3$ or $1/R_3$ to the party $P_3$ and generates the first product $R_3X_2$ transmitted to the party $P_1$, meanwhile, after the party $P_3$ receives $R_3$ or $1/R_3$, the party $P_3$ generates the second product $X_3/R_3$ and transmits the second product $X_3/R_3$ to the party $P_1$, and thus, the party $P_1$ can calculate $X_2X_3$ based on the first product $R_3X_2$ and the second product $X_3/R_3$, and then calculates the first data comparison operator $X_1^2-X_2X_3$.

Step 1104: Receive a fourth product transmitted by the third node device and a fifth product transmitted by the first node device.

The third node device is configured to generate a fourth random number and transmit the fourth random number to the first node device. The first node device is configured to determine the fifth product based on the fourth random number. The fourth product is the product of the valid node data of the third node device and the fourth random number. The fifth product is the product of the reciprocal of the fourth random data and the valid node data of the first node device.

Similarly, when the party $P_2$ needs to calculate $X_2^2-X_1X_3$, the party $P_3$ (or the party $P_1$) takes charge of generating the fourth random number $R_4$, the party $P_3$ performs computation and transmits the fourth product $R_4X_3$ to the party $P_2$, the party $P_3$ transmits the fourth random data $R_4$ or the reciprocal $1/R_4$ of the fourth random number to the party $P_1$, and the party $P_1$ performs computation and transmits the fifth product $X_1/R_4$ to the party $P_2$.

Step 1105: Calculate a second value comparison operator based on the fourth product and the fifth product.

The second value comparison operator is the difference between the square of the valid node data of the second node device and a sixth product, and the sixth product is the product of the valid node data of the first node device and the valid node data of the third node device.

The party $P_2$ calculates $X_1X_3$ based on the fourth product $R_4X$ and the fifth product $X_1/R_4$, and then calculates the second data comparison operator $X_2^2-X_1X_3$.

Step 1106: Determine that the valid node data corresponding to the second node device is the extremum in response to the second data comparison operator being greater than or equal to zero and the second node data being greater than or equal to an $(n-2)^{th}$ mean in $(n-2)^{th}$ round federated computation.

The second node data is the valid node data or the invalid node data of the second node device.

In the embodiment of the present disclosure, when $(n-1)^{th}$ round extremum determination is performed, value comparison is performed without continuing to adopt the mean-based computation method, but the value comparison operator is calculated through a secure multi-party multiplication computation method, which can avoid the situation that the node device having the valid node data can calculate the other valid node data when there are only two valid node data left, thereby further improving data security.

The above embodiment illustrates the process of determining the extremum by the three parties, and actually, when the number of the parties is an odd number, the method can be adopted to perform $(n-1)^{th}$ round extremum determination.

It is worth mentioning that except computation of $X_i^{n-1}$-$X_1 X_2 \ldots X_n$, the node devices can also calculate equations of other forms, such as $X_i^{2n-2}$-$X_1^2 X_2^2 \ldots X_n^2$, where the product behind the minus does not include $X_i^2$, and is the product of the square of other $(n-1)$ node data except $X_1$. The computational formula used by the node devices is not limited in the embodiment of the present disclosure.

In one embodiment, when there are a large number of parties, node device division can be performed by adopting a hierarchical mode, and after extremum computation in one layer is finished, computation of a next layer continues, so as to reduce communication overhead and extremum determining duration. For example, when n is 5, the parties can be divided into $P_1 P_2 P_3$, $P_4$, $P_5$, where each layer has three groups; and when n is 7, the parties can be divided into $P_1 P_2 P_3$, $P_3 P_4 P_5$ and $P_6$, each layer has three groups, that is, one party can appear in a plurality of groups, and each group is composed of one or at least three node devices. When n is large, multi-layer grouping can be performed.

Before mean computation, the method for determining an extremum based on secure multi-party computation further includes the following steps.

Step 4: Divide n node devices into at least one layer of device groups according to a group division mode if n is greater than 3, where each layer of device groups includes at least three device groups of a previous layer, and each device group in a first layer of device groups is composed of one or at least three node devices.

For example, when n is 27, nine device groups are divided in a first layer, and each group has three parties, namely, $G_1=\{P_1 P_2 P_3\}$, $G_2=\{P_4 P_5 P_6\}$ ... $G_9=\{P_{25} P_{26} P_{27}\}$; and in grouping of a second layer, the nine groups of the first layer are divided into three groups, and each group of the second layer includes three groups of the first layer, namely, $\{G_1 G_2 G_3\}$, $\{G_4 G_5 G_6\}$ and $\{G_7 G_8 G_9\}$.

Step 5: Perform federated computation among device groups in an $(m+1)^{th}$ layer based on valid node data of an $i^{th}$ node device if the valid node data of the $i^{th}$ node device is an extremum of a party group where the $i^{th}$ node device is located in device groups in an $m^{th}$ layer.

After at least one owner of the extremum is determined in groups in a lower layer, a group representative is selected therefrom to perform extremum determination among groups of a next layer (i.e., a higher layer). When there are at least two parties having the extremum, one party can be selected according to whether a computing resource of the parties is rich or not, whether network communication is strong or not, reliability, security, computation complexity and other aspects, or is randomly selected, which is not limited in the embodiment of the present disclosure.

Figure 13:
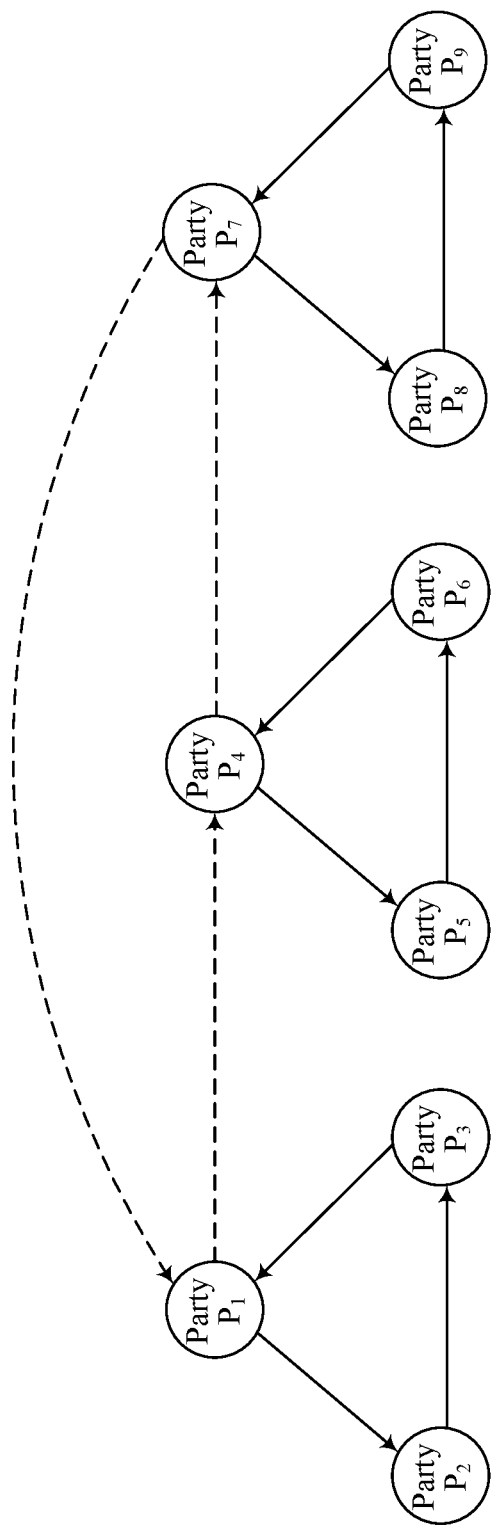
FIG. 13 is a schematic diagram of multi-layer device group division according to an embodiment of the present disclosure.

As shown in FIG. 13, when it is determined that a party $P_1$ has an extreme in a first device group constituted by the party $P_1$, a party $P_2$ and a party $P_3$, a party $P_4$ has an extremum in a second device group constituted by the party $P_4$, a party $P_5$ and a party $P_6$ and a party $P_7$ has an extremum in a third device group constituted by the party $P_7$, a party $P_8$ and a party $P_9$, the party $P_1$, the party $P_4$ and the party $P_7$ perform extremum determination among groups of a next layer.

Step 6: Determine that the valid node data of the $i^{th}$ node device is an extremum of n valid node data in the n node devices if the valid node data of the $i^{th}$ node device is the extremum of the valid node data in device groups of a last layer.

After last-layer extremum determination is performed and final federated computation is completed, if the valid node data of the $i^{th}$ node device is the extremum, it is determined that the valid node data of the $i^{th}$ node device is the extremum of the n valid node data in the n node devices.

In the embodiment of the present disclosure, when there are a large number of node devices, intragroup extremum determination is first performed in a group division mode, then, extremum determination among the groups is performed, and meanwhile multi-layer grouping can be performed, thereby reducing communication overhead, reducing computation complexity and improving extremum determination efficiency.

Figure 14:
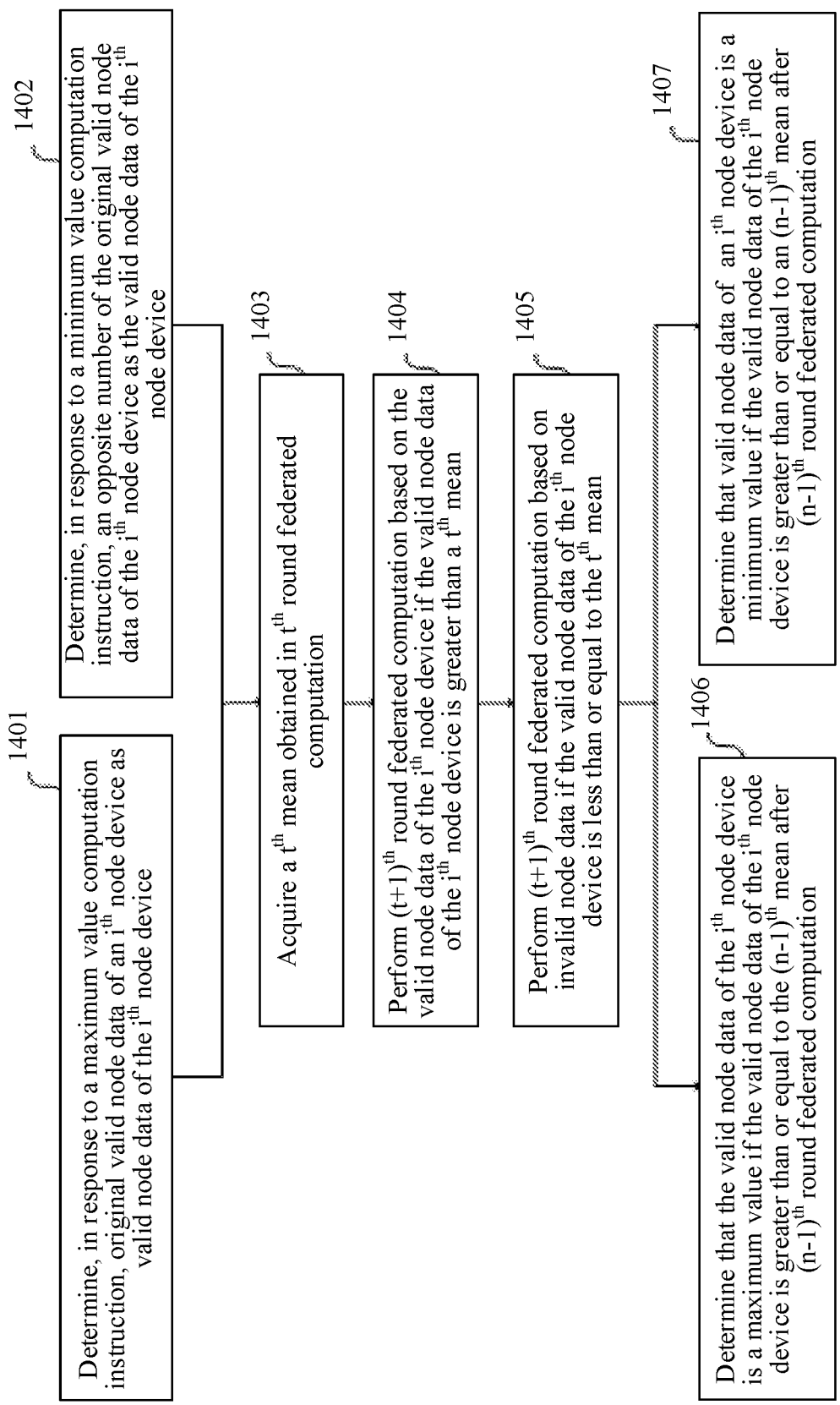
FIG. 14 is a flowchart of a method for determining an extremum based on secure multi-party computation according to an embodiment of the present disclosure.

The above embodiments illustrate the process of determining the extremum based on secure multi-party computation, where the extremum may be a maximum value or a minimum value. If the maximum value is required to be determined, extremum comparison is directly performed according to the above steps, and the obtained extremum is the maximum value; and if the minimum value is required to be determined, the node devices first perform negation operation on local original valid node data, opposite numbers serve as valid node data for extremum comparison, the opposite number extremum is obtained, and then negation operation is performed to determine the minimum value. FIG. 14 illustrates a flowchart of a secure multi-party computation method according to another exemplary embodiment of the present disclosure. The embodiment is described with executing, by an $i^{th}$ node device in a federated computation system, the method as an example. The federated computation system includes n node devices, n is an integer greater than 2, and i is a positive integer less than or equal to n. When n is 3 and t+1 is n-1, the method includes the following steps.

Step 1401: Determine original valid node data of the $i^{th}$ node device as valid node data of the $i^{th}$ node device in response to a maximum value computation instruction.

Step 1402: Determine an opposite number of the original valid node data of the $i^{th}$ node device as the valid node data of the $i^{th}$ node device in response to a minimum value computation instruction.

When the maximum value is required to be determined from the data of the n node devices, the node devices can determine the original valid node data as the valid node data for subsequent federated computation; and when the minimum value is required to be determined from the data of the n node devices, the extremum determination is performed by gradually obsoleting the data less than the mean in the above process, and thus, the node devices determine the opposite numbers of the valid node data as the valid node data for subsequent federated computation, and the minimum value is determined by determining the maximum value in the opposite numbers.

Step 1403: Acquire a $t^{th}$ mean obtained in $t^{th}$ round federated computation.

Step 1404: Perform $(t+1)^{th}$ round federated computation based on the valid node data of the $i^{th}$ node device if the valid node data of the $i^{th}$ node device is greater than the $t^{th}$ mean.

Step 1405: Perform $(t+1)^{th}$ round federated computation based on invalid node data if the valid node data of the $i^{th}$ node device is less than or equal to the $t^{th}$ mean.

Exemplary implementations of step 1403 to step 1405 may refer to step 201 to step 203 described above, and are not repeated herein.

Step 1406: Determine that the original valid node data of the $i^{th}$ node device is the extremum if the valid node data of the $i^{th}$ node device is greater than or equal to an $(n-1)^{th}$ mean after $(n-1)^{th}$ round federated computation.

After $(n-1)^{th}$ round federated computation (i.e., final federated computation), the valid node data of the $i^{th}$ node device is greater than or equal to the $(n-1)^{th}$ mean, and thus, the valid node data is the maximum value in the n valid node data. Because the valid node data is the original valid node data per se, the original valid node data of the $i^{th}$ node device is determined as the maximum value.

Step 1407: Determine that the original valid node data of the $i^{th}$ node device is the minimum value if the valid node data of the $i^{th}$ node device is greater than or equal to the $(n-1)^{th}$ mean after $(n-1)^{th}$ round federated computation.

After $(n-1)^{th}$ round federated computation, the valid node data of the $i^{th}$ node device is greater than or equal to the $(n-1)^{th}$ mean, and thus, the valid node data is the maximum value in the n valid node data. Because the valid node data is the opposite number of the original valid node data, the original valid node data of the $i^{th}$ node device is determined as the minimum value.

In the embodiment of the present disclosure, if the minimum value is required to be determined, negation operation can be performed on the original valid node data, the process of determining an extremum based on secure multi-party computation is performed based on the opposite numbers, and the maximum value in the opposite numbers can be determined, that is, the minimum value in the original valid node data is obtained; and if the maximum value is required to be determined, federated computation is directly performed based on the original valid node data, and thus, the solution provided by the present disclosure can satisfy the maximum value determining demand and can also satisfy the minimum value determining demand.

Figure 15:
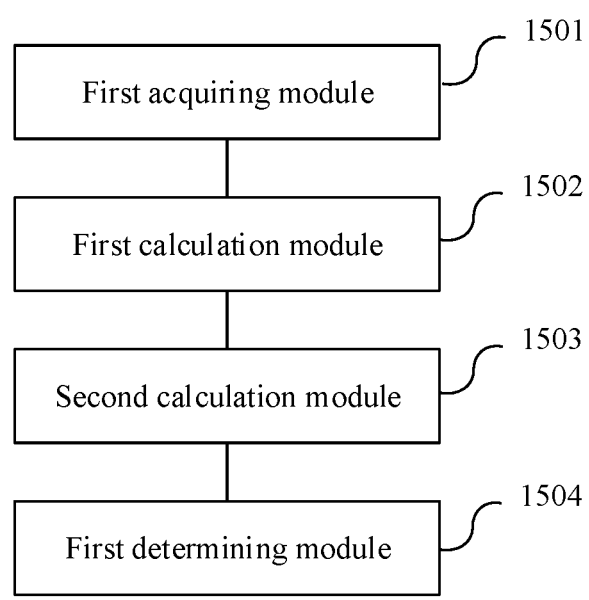
FIG. 15 is a structural block diagram of an apparatus for determining an extremum based on secure multi-party computation according to an embodiment of the present disclosure.

FIG. 15 is a structural block diagram of an apparatus for determining an extremum based on secure multi-party computation according to an exemplary embodiment of the present disclosure. The apparatus includes following structures:

- a first acquiring module 1501 configured to acquire a $t^{th}$ mean obtained in $t^{th}$ round federated computation, where the $t^{th}$ mean is calculated based on the n node data of n node devices and an average coefficient, the n node data includes m valid node data, the average coefficient is decreased progressively along with the increasing of the round number of federated computation, t is a positive integer less than n−1, and m is a positive integer less than or equal to n;
- a first calculation module 1502 configured to perform $(t+1)^{th}$ round federated computation based on valid node data of an $i^{th}$ node device if the valid node data of the $i^{th}$ node device is greater than the $t^{th}$ mean;
- a second calculation module 1503 configured to perform $(t+1)^{th}$ round federated computation based on the invalid node data when the valid node data of the $i^{th}$ node device is less than or equal to the $t^{th}$ mean; and
- a first determining module 1504 configured to determine that the valid node data of the $i^{th}$ node device is the extremum if the valid node data of the $i^{th}$ node device is greater than or equal to an $(n-1)^{th}$ mean after $(n-1)^{th}$ round federated computation.

In one embodiment, the second calculation module 1503 includes:

- a first calculation unit configured to perform $(t+1)^{th}$ round federated computation based on the invalid node data when the valid node data of the $i^{th}$ node device is less than the $t^{th}$ mean, and determine that the valid node data corresponding to the $i^{th}$ node device is not the extremum; and
- a second calculation unit configured to perform $(t+1)^{th}$ round federated computation based on the invalid node data if the valid node data of the $i^{th}$ node device is equal to the $t^{th}$ mean, and determine the extremum based on a relationship between a $(t+1)^{th}$ mean and the invalid node data.

In one embodiment, the second calculation unit is further configured to:

- determine that the valid node data corresponding to the $i^{th}$ node device is not the extremum when the $(t+1)^{th}$ mean is greater than the invalid node data;
- determine that the valid node data of the $i^{th}$ node device is the extremum when the $(t+1)^{th}$ mean is equal to the invalid node data, and t+1 is n−1; and
- determine the extremum based on a relationship between the invalid node data and a mean obtained through subsequent federated computation when the $(t+1)^{th}$ mean is equal to the invalid node data and t+1 is less than n−1.

In one embodiment, the $i^{th}$ node device is a first node device, and the first acquiring module 1501 includes:

- a first generation unit configured to generate a first random number;
- a first transmitting unit configured to calculate the sum of first node data and the first random number to serve as a first data sum, and transmit the first data sum to a second node device, where the second node device is configured to calculate a second data sum and transmit the second data sum to a third node device, and the second data sum is the sum of the first data sum and second node data, $j^{th}$ node data is valid node data or invalid node data of a $j^{th}$ node device, and j is a positive integer less than or equal to n;
- a first receiving unit configured to receive an $n^{th}$ data sum transmitted by an $n^{th}$ node device, where the $n^{th}$ data sum is the sum of n node data and the first random number; and
- a first determining unit configured to determine the $t^{th}$ mean based on the $n^{th}$ data sum and the first random number.

In one embodiment, the first acquiring module 1501 further includes:

- a second receiving unit configured to receive a $(j-1)^{th}$ data sum transmitted by a $(j-1)^{th}$ node device, where the $(j-1)^{th}$ data sum is the sum of the first random number and the first node data to $(j-1)^{th}$ node data, and j is an integer greater than 1 and less than or equal to n;
- a second determining unit configured to determine a $j^{th}$ data sum based on the $(j-1)^{th}$ data sum, where the $j^{th}$ data sum is the sum of the $(j-1)^{th}$ data sum and $j^{th}$ node data;
- a second transmitting unit configured to transmit the $j^{th}$ data sum to a $(j+1)^{th}$ node device when j is not equal to n, and transmitting the $j^{th}$ data sum to the first node device when j is equal to n.

In one embodiment, the first acquiring module 1501 includes:

- a second generation unit configured to generate n−1 random numbers, where the sum of the n−1 random numbers is $i^{th}$ node data, and the $i^{th}$ node data is valid node data or invalid node data of the $i^{th}$ node device;
- a third transmitting unit configured to respectively transmit the n−1 random numbers to the rest of n−1 node devices, where each node device receives one random number transmitted by the $i^{th}$ node device;

a third receiving unit configured to receive the random numbers respectively transmitted by the rest of n−1 node devices, and calculate the sum of the received n−1 random numbers to serve as an $i^{th}$ data sum;

a fourth transmitting unit configured to respectively transmit the $i^{th}$ data sum to the rest of n−1 node devices; and a fourth receiving unit configured to receive n−1 data sums transmitted by the rest of n−1 node devices, and determine the $t^{th}$ mean based on the received n−1 data sums and the $i^{th}$ data sum.

In one embodiment, t+1 is n−1, and the apparatus further includes:

a first generation module configured to generate a second random number which is a positive number;

a first transmitting module configured to transmit the second random number to an $(i+1)^{th}$ node device, where the $(i+1)^{th}$ node device is configured to calculate a first data product and transmit the first data product to an $(i+2)^{th}$ node device, where the first data product is the product of the second random number and valid node data of the $(i+1)^{th}$ node device;

a first receiving module configured to receive an $(n-1)^{th}$ data product transmitted by an $(i-1)^{th}$ node device, where the $(n-1)^{th}$ data product is the product of valid node data of the n−1 node devices except the $i^{th}$ node device in the n node devices and the second random number;

a second determining module configured to determine a value comparison operator according to a difference between the valid node data of the $i^{th}$ node device to the power of n−1 and the $(n-1)^{th}$ data product; and a third determining module configured to determine that the valid node data corresponding to the $i^{th}$ node device is the extremum if the value comparison operator is greater than or equal to zero and the $i^{th}$ node data is greater than or equal to an $(n-2)^{th}$ mean in $(n-2)^{th}$ round federated computation, where the $i^{th}$ node data is the valid node data or the invalid node data.

In one embodiment, n is 3, t+1 is 2, the $i^{th}$ node device is the second node device, and the apparatus further includes:

a second generation module configured to generate a third random number which is a positive number;

a second transmitting module configured to transmit the third random number or the reciprocal of the third random number to the third node device and transmit a first product to the first node device, where the first product is the product of the third random number and valid node data of the second node device, the third node device is configured to calculate a second product and transmit the second product to the first node device, the second product is the product of the reciprocal of the third random number and valid node data of the third node device, the first node device is configured to receive the first product and the second product and calculate a first value comparison operator based on the first product and the second product, the first value comparison operator is a difference between the square of valid node data of the first node device and a third product, and the third product is the product of second node data and third node data.

In one embodiment, the apparatus further includes:

a second receiving module configured to receive a fourth product transmitted by the third node device and a fifth product transmitted by the first node device, where the third node device is configured to generate a fourth random number and transmit the fourth random number to the first node device, the first node device is configured to determine the fifth product based on the fourth random number, the fourth product is the product of the valid node data of the third node device and the fourth random number, and the fifth product is the product of the reciprocal of the fourth random data and the valid node data of the first node device;

a third calculation module configured to calculate a second value comparison operator based on the fourth product and the fifth product, where the second value comparison operator is a difference between the square of the valid node data of the second node device and a sixth product, and the sixth product is the product of the valid node data of the first node device and the valid node data of the third node device; and a fourth determining module configured to determine that the valid node data corresponding to the second node device is the extremum if the second data comparison operator is greater than or equal to zero and the second node data is greater than or equal to the $(n-2)^{th}$ mean in $(n-2)^{th}$ round federated computation, where the second node data is the valid node data or the invalid node data of the second node device.

In one embodiment, the apparatus further includes:

a grouping module configured to divide the n node devices into at least one layer of device groups according to a group division mode if n is greater than 3, where each layer of device groups includes at least three device groups of a previous layer, and each device group in a first layer of device groups is composed of one or at least three node devices;

a fourth calculation module configured to perform federated computation among device groups in an $(m+1)^{th}$ layer based on valid node data of the $i^{th}$ node device if the valid node data of the $i^{th}$ node device is an extremum of a party group where the $i^{th}$ node device is located in device groups in an $m^{th}$ layer, where m is a positive integer; and a fifth determining module configured to determine that the valid node data of the $i^{th}$ node device is an extremum of n valid node data corresponding to the n node devices if the valid node data of the $i^{th}$ node device is the extremum of valid node data in device groups of a last layer.

In one embodiment, the apparatus further includes:

a sixth determining module configured to determine original valid node data of the $i^{th}$ node device as the valid node data of the $i^{th}$ node device in response to a maximum value computation instruction; and the first determining module 1504 further includes:

a third determining unit configured to determine that the original valid node data of the $i^{th}$ node device is a maximum value if the valid node data of the $i^{th}$ node device is greater than or equal to the $(n-1)^{th}$ mean after $(n-1)^{th}$ round federated computation.

In one embodiment, the apparatus further includes:

a seventh determining module configured to determine an opposite number of the original valid node data of the $i^{th}$ node device as the valid node data of the $i^{th}$ node device in response to a minimum value computation instruction; and the first determining module 1504 further includes:

a fourth determining unit configured to determine that the original valid node data of the $i^{th}$ node device is a minimum value if the valid node data of the $i^{th}$ node device is greater than or equal to the $(n-1)^{th}$ mean after $(n-1)^{th}$ round federated computation.

As such, the mean of the data corresponding to the n node devices is calculated, the node devices compare the own data with the mean jointly calculated in the previous round so as to confirm that the own data is not the extremum when the own data is less than the mean, replace the valid node data with the invalid node data for next-round mean computation when the own data is less than or equal to the mean so that the jointly-calculated mean can be converged and gradually approach the extremum, and accordingly, a result is obtained in the $(n-1)^{th}$ round, thereby effectively solving the problem about secure multi-party extremum computation; and in addition, the node devices do not need to reveal privacy data and a value relationship between the data, and based on the secure multi-party mean computation method, do not involve encryption and decryption operations, accordingly, the computation complexity and the communication overhead are low, and the computing efficiency can be improved.

Figure 16:
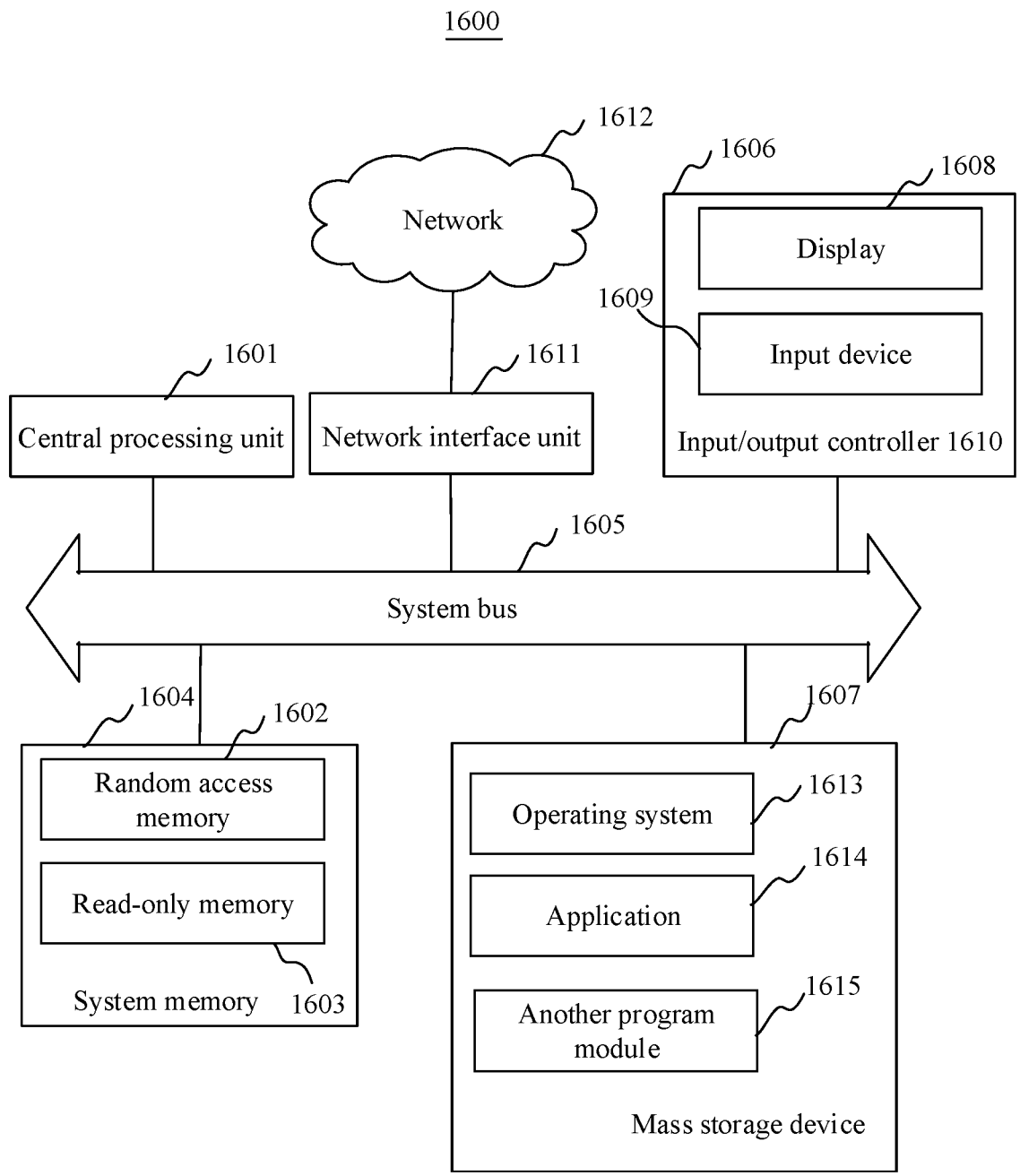
FIG. 16 is a structural block diagram of a computer device according to an embodiment of the present disclosure.

FIG. 16 illustrates a schematic structural diagram of a computer device according to an embodiment of the present disclosure.

The computer device 1600 includes a central processing unit (CPU) 1601, a system memory 1604 including a random access memory (RAM) 1602 and a read only memory 1603, and a system bus 1605 connecting the system memory 1604 and the central processing unit 1601. The computer device 1600 further includes a basic input/output (I/O) controller 1606 assisting in transmitting information between components in a computer, and a mass storage device 1607 configured to store an operating system 1613, an application 1614, and another program module 1615.

The basic input/output system 1606 includes a display 1608 configured to display information, and an input device 1609 configured to input information by a user, such as a mouse and a keyboard. The display 1608 and the input device 1609 are connected to the central processing unit 1601 through an input/output controller 1610 connected to the system bus 1605. The basic input/output system 1606 may further include the input/output controller 1610, for receiving and processing an input from multiple other devices such as the keyboard, the mouse, or an electronic stylus. Similarly, the input/output controller 1610 further provides an output to a display screen, a printer, or another type of output device.

The mass storage device 1607 is connected to the central processing unit 1601 by using a mass storage controller (not shown) connected to the system bus 1605. The mass storage device 1607 and a computer-readable medium associated therewith provide non-volatile storage for the computer device 1600. That is, the mass storage device 1607 may include a computer-readable medium (not shown) such as a hard disk or a compact disc read-only memory (CD-ROM) drive.

In general, the computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes the RAM, the ROM, an erasable programmable read only memory (EPROM), a flash memory or another solid-state memory technology, a CD-ROM, a digital video disc (DVD) or another optical memory, a tape cartridge, a tape, a magnetic disk memory, or another magnetic storage device. Certainly, a person skilled in the art may learn that the computer storage medium is not limited to the foregoing several types. The system memory 1604 and the mass storage device 1607 may be generally called a memory.

According to the embodiments of the present disclosure, the computer device 1600 may further be connected, through a network such as the Internet, to a remote computer on the network to run. That is, the computer device 1600 may be connected to a network 1612 by using a network interface unit 1611 connected to the system bus 1605, or may be connected to another type of network or a remote computer system (not shown) by using the network interface unit 1611.

The memory further includes at least one instruction, at least one program, a code set, or an instruction set, and the at least one instruction, the at least one program, the code set, or the instruction set is stored in the memory and configured to be executed by one or more processors to implement the method for determining an extremum based on secure multi-party computation.

An embodiment of the present disclosure further provides a computer-readable storage medium. The computer-readable storage medium stores at least one instruction, and the at least one instruction is loaded and executed by a processor to implement the method for determining an extremum based on secure multi-party computation according to the foregoing embodiments.

According to one aspect of the present disclosure, a computer program product or a computer program is provided and includes computer instructions. The computer instructions are stored in a computer-readable storage medium. A processor of a computer device reads the computer instructions from the computer-readable storage medium and executes the computer instructions to enable the computer device to execute the method for determining an extremum based on secure multi-party computation in the foregoing various optional implementations.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person skilled in the art is to be aware that in the foregoing one or more examples, functions described in the embodiments of the present disclosure may be implemented by hardware, software, firmware, or any combination thereof. When implemented by using the software, the functions can be stored in the computer-readable medium or can be used as one or more instructions or codes in the computer-readable medium to be transmitted. The computer-readable medium includes a computer storage medium and a communication medium, where the communication medium includes any medium that facilitates a computer program to be transmitted from one place to another. The storage medium may be any available medium accessible to a general-purpose or dedicated computer.

The foregoing descriptions are merely optional embodiments of the present disclosure, but are not intended to limit the present disclosure. Any modification, equivalent replacement, improvement, etc. made within the spirit and principle of the present disclosure shall fall within the scope of protection of the present disclosure.

What is claimed is:

1. A method for determining an extremum based on secure multi-party computation, executed by an $i^{th}$ node device in a federated computation system, the federated computation system comprising n node devices, n being an integer greater than 2, i being a positive integer less than or equal to n, the n node devices respectively comprising at least one memory storing own data which cannot be revealed, and the method comprising:
in response to an extremum determining request, performing a secure multi-party extremum determining process, comprising:
acquiring a $t^{th}$ mean obtained in th round federated computation, the $t^{th}$ mean being calculated based on n node data of the n node devices and an average coefficient, the n node data comprising m valid node data, the average coefficient being decreased progressively along with increasing of the round number of federated computation, t being a positive integer less than n−1, and m being a positive integer less than or equal to n;
performing $(t+1)^{th}$ round federated computation based on the valid node data of the $i^{th}$ node device in response to the valid node data of the $i^{th}$ node device being greater than the $t^{th}$ mean;
performing the $(t+1)^{th}$ round federated computation based on the invalid node data in response to the valid node data of the $i^{th}$ node device being less than or equal to the $t^{th}$ mean;
determining that the valid node data of the $i^{th}$ node device is the extremum in response to the valid node data of the $i^{th}$ node device being greater than or equal to an $(n-1)^{th}$ mean after $(n-1)^{th}$ round federated computation, wherein during the federated computation, data of one of the n node devices is not revealed to another one of the n node devices; and
storing data involved in the secure multi-party extremum determining process on a blockchain for the node devices to communicate in a secure manner.

2. The method according to claim 1, wherein performing the $(t+1)^{th}$ round federated computation based on the invalid node data in response to the valid node data of the $i^{th}$ node device being less than or equal to the $t^{th}$ mean comprises:
performing $(t+1)^{th}$ round federated computation based on the invalid node data in response to the valid node data of the $i^{th}$ node being less than the $t^{th}$ mean, and determining that the valid node data corresponding to the $i^{th}$ node device is not the extremum; and
performing $(t+1)^{th}$ round federated computation based on the invalid node data in response to the valid node data of the $i^{th}$ node device being equal to the $t^{th}$ mean, and determining the extremum based on a relationship between a $(t+1)^{th}$ mean and the invalid node data.

3. The method according to claim 2, wherein determining the extremum based on the relationship between the $(t+1)^{th}$ mean and the invalid node data, comprises:
determining that the valid node data corresponding to the $i^{th}$ node device is not the extremum in response to the $(t+1)^{th}$ mean being greater than the invalid node data;
determining that the valid node data of the $i^{th}$ node device is the extremum in response to the $(t+1)^{th}$ mean being equal to the invalid node data, and t+1 is n−1; and
determining the extremum based on a relationship between the invalid node data and a mean obtained through subsequent federated computation in response to the $(t+1)^{th}$ mean being equal to the invalid node data and t+1 is less than n−1.

4. The method according to claim 1, wherein the $i^{th}$ node device is a first node device, and acquiring the $t^{th}$ mean obtained in the $t^{th}$ round federated computation comprises:
generating a first random number;
calculating the sum of first node data and the first random number to serve as a first data sum, and transmitting the first data sum to a second node device, wherein the second node device is configured to calculate a second data sum and transmit the second data sum to a third node device, and the second data sum is the sum of the first data sum and second node data, wherein a $j^{th}$ node data is valid node data or invalid node data of a $j^{th}$ node device, and j is a positive integer less than or equal to n;
receiving an $n^{th}$ data sum transmitted by an $n^{th}$ node device, the $n^{th}$ data sum being the sum of n node data and the first random number; and
determining the $t^{th}$ mean based on the $n^{th}$ data sum and the first random number.

5. The method according to claim 4, further comprising:
receiving a $(j-1)^{th}$ data sum transmitted by a $(j-1)^{th}$ node device, the $(j-1)^{th}$ data sum being the sum of the first random number and the first node data to the $(j-1)^{th}$ node data, and j being an integer greater than 1 and less than or equal to n;
determining a $j^{th}$ data sum based on the $(j-1)^{th}$ data sum, the $j^{th}$ data sum being the sum of the $(j-1)^{th}$ data sum and the $j^{th}$ node data;
transmitting the $j^{th}$ data sum to a $(j+1)^{th}$ node device when j is not equal to n; and
transmitting the $j^{th}$ data sum to the first node device when j is equal to n.

6. The method according to claim 1, wherein acquiring the $t^{th}$ mean obtained in the $t^{th}$ round federated computation comprises:
generating n−1 random numbers, the sum of the n−1 random numbers being $i^{th}$ node data, and the $i^{th}$ node data being valid node data or invalid node data of the $i^{th}$ node device;
respectively transmitting the n−1 random numbers to the rest of n−1 node devices, each node device receiving one random number transmitted by the $i^{th}$ node device;
receiving the random numbers respectively transmitted by the rest of the n−1 node devices and calculating the sum of the received n−1 random numbers to serve as an $i^{th}$ data sum;
respectively transmitting the $i^{th}$ data sum to the rest of n−1 node devices; and
receiving n−1 data sums transmitted by the rest of n−1 node devices, and determining the $t^{th}$ mean based on the received n−1 data sums and the $i^{th}$ data sum.

7. The method according to claim 1, wherein t+1 is n−1, and after acquiring the $t^{th}$ mean obtained in the $t^{th}$ round federated computation, the method further comprises:
generating a second random number, the second random number being a positive number;
transmitting the second random number to an $(i+1)^{th}$ node device, the $(i+1)^{th}$ node device being configured to calculate a first data product and transmit the first data product to an $(i+2)^{th}$ node device, the first data product being the product of the second random number and valid node data of the $(i+1)^{th}$ node device;
receiving an $(n-1)^{th}$ data product transmitted by an $(i-1)^{th}$ node device, the $(n-1)^{th}$ data product being the product of valid node data of n−1 node devices except the $i^{th}$ node device in the n node devices and the second random number;

determining a value comparison operator according to a difference between the valid node data of the $i^{th}$ node device to the power of n−1 and the $(n-1)^{th}$ data product; and determining that the valid node data corresponding to the $i^{th}$ node device is the extremum in response to the value comparison operator being greater than or equal to zero and $i^{th}$ node data is greater than or equal to an $(n-2)^{th}$ mean in $(n-2)^{th}$ round federated computation, the $i^{th}$ node data being valid node data or invalid node data.

8. The method according to claim 1, wherein n is 3, t+1 is 2, the $i^{th}$ node device is a second node device, and after acquiring the $t^{th}$ mean obtained in the $t^{th}$ round federated computation, the method further comprises:

generating a third random number, the third random number being a positive number; and transmitting the third random number or a reciprocal of the third random number to a third node device, and transmitting a first product to a first node device, the first product being the product of the third random number and valid node data of a second node device, the third node device being configured to calculate a second product and transmit the second product to the first node device, the second product is the product of the reciprocal of the third random number and valid node data of the third node device, the first node device being configured to receive the first product and the second product and calculate a first value comparison operator based on the first product and the second product, the first value comparison operator being a difference between the square of valid node data of the first node device and a third product, and the third product being the product of the second node data and the third node data.

9. The method according to claim 8, further comprising:

receiving a fourth product transmitted by the third node device and a fifth product transmitted by the first node device, the third node device being configured to generate a fourth random number and transmit the fourth random number to the first node device, the first node device being configured to determine the fifth product based on the fourth random number, the fourth product being the product of the valid node data of the third node device and the fourth random number, and the fifth product being the product of the reciprocal of the fourth random data and the valid node data of the first node device;

calculating a second value comparison operator based on the fourth product and the fifth product, the second value comparison operator being the difference between the square of the valid node data of the second node device and a sixth product, and the sixth product being the product of the valid node data of the first node device and the valid node data of the third node device; and determining that the valid node data corresponding to the second node device is the extremum in response to the second data comparison operator being greater than or equal to zero and the second node data being greater than or equal to an $(n-2)^{th}$ mean in $(n-2)^{th}$ round federated computation, the second node data being the valid node data or the invalid node data of the second node device.

10. The method according to claim 1, further comprising:

dividing n node devices into at least one layer of device groups according to a group division mode in response to n being greater than 3, each layer of device groups comprising at least three device groups of a previous layer, and each device group in a first layer of device groups being composed of one or at least three node devices, performing federated computation among device groups in an $(m+1)^{th}$ layer based on valid node data of the $i^{th}$ node device in response to the valid node data of the $i^{th}$ node device being an extremum of a party group, wherein the $i^{th}$ node device is located in device groups in an $m^{th}$ layer, and m being a positive integer; and determining that the valid node data of the $i^{th}$ node device is an extremum of n valid node data of the n node devices in response to the valid node data of the $i^{th}$ node device being the extremum of the valid node data in device groups of a last layer.

11. The method according to claim 1, wherein before the acquiring a $t^{th}$ mean obtained in th round federated computation, the method further comprises:

determining original valid node data of the $i^{th}$ node device as the valid node data of the $i^{th}$ node device in response to a maximum value computation instruction; and the determining that the valid node data of the $i^{th}$ node device is the extremum in response to the valid node data of the $i^{th}$ node device being greater than or equal to an $(n-1)^{th}$ mean after $(n-1)^{th}$ round federated computation comprises:

determining that original valid node data of the $i^{th}$ node device is a maximum value in response to the valid node data of the $i^{th}$ node device being greater than or equal to the $(n-1)^{th}$ mean after $(n-1)^{th}$ round federated computation.

12. The method according to claim 1, further comprising:

determining an opposite number of original valid node data of the $i^{th}$ node device as the valid node data of the $i^{th}$ node device in response to a minimum value computation instruction; and the determining that the valid node data of the $i^{th}$ node device is the extremum in response to the valid node data of the $i^{th}$ node device being greater than or equal to an $(n-1)^{th}$ mean after $(n-1)^{th}$ round federated computation comprises:

determining that the original valid node data of the $i^{th}$ node device is a minimum value in response to the valid node data of the $i^{th}$ node device being greater than or equal to the $(n-1)^{th}$ mean after $(n-1)^{th}$ round federated computation.

13. A computer device, comprising a processor and a memory, the memory storing at least one instruction, at least one program, a code set or an instruction set, and the at least one instruction, the at least one program, the code set or the instruction set being loaded and executed by the processor to implement operations for determining an extremum based on secure multi-party computation, the computer device being an $i^{th}$ node device in a federated computation system, the federated computation system comprising n node devices, n being an integer greater than 2, i being a positive integer less than or equal to n, the n node devices respectively comprising at least one memory storing own data which cannot be revealed, and the operations comprising:

in response to an extremum determining request, performing a secure multi-party extremum determining process, comprising:

acquiring a $t^{th}$ mean obtained in $t^{th}$ round federated computation, the $t^{th}$ mean being calculated based on n node data of the n node devices and an average coefficient, the n node data comprising m valid node data, the average coefficient being decreased progressively along with increasing of the round number of federated computation, t being a positive integer less than n−1, and m being a positive integer less than or equal to n;

performing $(t+1)^{th}$ round federated computation based on the valid node data of the $i^{th}$ node device in response to the valid node data of the $i^{th}$ node device being greater than the $t^{th}$ mean;

performing the $(t+1)^{th}$ round federated computation based on the invalid node data in response to the valid node data of the $i^{th}$ node device being less than or equal to the $t^{th}$ mean;

determining that the valid node data of the $i^{th}$ node device is the extremum in response to the valid node data of the $i^{th}$ node device being greater than or equal to an $(n-1)^{th}$ mean after $(n-1)^{th}$ round federated computation, wherein during the federated computation, data of one of the n node devices is not revealed to another one of the n node devices; and storing data involved in the secure multi-party extremum determining process on a blockchain for the node devices to communicate in a secure manner.

14. The device according to claim 13, wherein performing the $(t+1)^{th}$ round federated computation based on the invalid node data in response to the valid node data of the $i^{th}$ node device being less than or equal to the $t^{th}$ mean comprises:

performing $(t+1)^{th}$ round federated computation based on the invalid node data in response to the valid node data of the $i^{th}$ node being less than the $t^{th}$ mean, and determining that the valid node data corresponding to the $i^{th}$ node device is not the extremum; and performing $(t+1)^{th}$ round federated computation based on the invalid node data in response to the valid node data of the $i^{th}$ node device being equal to the $t^{th}$ mean, and determining the extremum based on a relationship between a $(t+1)^{th}$ mean and the invalid node data.

15. The device according to claim 14, wherein determining the extremum based on the relationship between the $(t+1)^{th}$ mean and the invalid node data comprises:

determining that the valid node data corresponding to the $i^{th}$ node device is not the extremum in response to the $(t+1)^{th}$ mean being greater than the invalid node data;

determining that the valid node data of the $i^{th}$ node device is the extremum in response to the $(t+1)^{th}$ mean being equal to the invalid node data, and t+1 is n−1; and determining the extremum based on a relationship between the invalid node data and a mean obtained through subsequent federated computation in response to the $(t+1)^{th}$ mean being equal to the invalid node data and t+1 is less than n−1.

16. The device according to claim 13, wherein the $i^{th}$ node device is a first node device, and acquiring the $t^{th}$ mean obtained in the $t^{th}$ round federated computation comprises:

generating a first random number;

calculating the sum of first node data and the first random number to serve as a first data sum, and transmitting the first data sum to a second node device, wherein the second node device is configured to calculate a second data sum and transmit the second data sum to a third node device, and the second data sum is the sum of the first data sum and second node data, wherein a $j^{th}$ node data is valid node data or invalid node data of a $j^{th}$ node device, and j is a positive integer less than or equal to n;

receiving an $n^{th}$ data sum transmitted by an $n^{th}$ node device, the $n^{th}$ data sum being the sum of n node data and the first random number; and determining the $t^{th}$ mean based on the $n^{th}$ data sum and the first random number.

17. The device according to claim 16, wherein the method further comprises:

receiving a $(j-1)^{th}$ data sum transmitted by a $(j-1)^{th}$ node device, the $(j-1)^{th}$ data sum being the sum of the first random number and the first node data to the $(j-1)^{th}$ node data, and j being an integer greater than 1 and less than or equal to n;

determining a $j^{th}$ data sum based on the $(j-1)^{th}$ data sum, the $j^{th}$ data sum being the sum of the $(j-1)^{th}$ data sum and the $j^{th}$ node data;

transmitting the $j^{th}$ data sum to a $(j+1)^{th}$ node device when j is not equal to n; and transmitting the $j^{th}$ data sum to the first node device when j is equal to n.

18. The device according to claim 13, wherein acquiring the $t^{th}$ mean obtained in the $t^{th}$ round federated computation comprises:

generating n−1 random numbers, the sum of the n−1 random numbers being $i^{th}$ node data, and the $i^{th}$ node data being valid node data or invalid node data of the $i^{th}$ node device;

respectively transmitting the n−1 random numbers to the rest of n−1 node devices, each node device receiving one random number transmitted by the $i^{th}$ node device;

receiving the random numbers respectively transmitted by the rest of the n−1 node devices and calculating the sum of the received n−1 random numbers to serve as an $i^{th}$ data sum;

respectively transmitting the $i^{th}$ data sum to the rest of n−1 node devices; and receiving n−1 data sums transmitted by the rest of n−1 node devices, and determining the $t^{th}$ mean based on the received n−1 data sums and the $i^{th}$ data sum.

19. The device according to claim 13, wherein t+1 is n−1, and after acquiring the $t^{th}$ mean obtained in the $t^{th}$ round federated computation, the method further comprises:

generating a second random number, the second random number being a positive number;

transmitting the second random number to an $(i+1)^{th}$ node device, the $(i+1)^{th}$ node device being configured to calculate a first data product and transmit the first data product to an $(i+2)^{th}$ node device, the first data product being the product of the second random number and valid node data of the $(i+1)^{th}$ node device;

receiving an $(n-1)^{th}$ data product transmitted by an $(i-1)^{th}$ node device, the $(n-1)^{th}$ data product being the product of valid node data of n−1 node devices except the $i^{th}$ node device in the n node devices and the second random number;

determining a value comparison operator according to a difference between the valid node data of the $i^{th}$ node device to the power of n−1 and the $(n-1)^{th}$ data product; and determining that the valid node data corresponding to the $i^{th}$ node device is the extremum in response to the value comparison operator being greater than or equal to zero and $i^{th}$ node data is greater than or equal to an $(n-2)^{th}$ mean in $(n-2)^{th}$ round federated computation, the $i^{th}$ node data being valid node data or invalid node data.

20. A non-transitory computer-readable storage medium, storing at least one computer program, the computer program being loaded and executed by a processor to implement operations for determining an extremum based on secure multi-party computation, the processor being included in an $i^{th}$ node device in a federated computation system, the federated computation system comprising n node devices, n being an integer greater than 2, i being a positive integer less than or equal to n, the n node devices respectively comprising at least one memory storing own data which cannot be revealed, and the operations comprising:

in response to an extremum determining request, performing a secure multi-party extremum determining process, comprising:

acquiring a $t^{th}$ mean obtained in $t^{th}$ round federated computation, the $t^{th}$ mean being calculated based on n node data of the n node devices and an average coefficient, the n node data comprising m valid node data, the average coefficient being decreased progressively along with increasing of the round number of federated computation, t being a positive integer less than n−1, and m being a positive integer less than or equal to n;

performing $(t+1)^{th}$ round federated computation based on the valid node data of the $i^{th}$ node device in response to the valid node data of the $i^{th}$ node device being greater than the $t^{th}$ mean;

performing the $(t+1)^{th}$ round federated computation based on the invalid node data in response to the valid node data of the $i^{th}$ node device being less than or equal to the $t^{th}$ mean;

determining that the valid node data of the $i^{th}$ node device is the extremum in response to the valid node data of the $i^{th}$ node device being greater than or equal to an $(n-1)^{th}$ mean after $(n-1)^{th}$ round federated computation, wherein during the federated computation, data of one of the n node devices is not revealed to another one of the n node devices; and storing data involved in the secure multi-party extremum determining process on a blockchain for the node devices to communicate in a secure manner.

* * * * *